US009067612B2

(12) United States Patent
Kobayashi

(10) Patent No.: US 9,067,612 B2
(45) Date of Patent: Jun. 30, 2015

(54) CARRIER AND STROLLER

(75) Inventor: Koichi Kobayashi, Tokyo-To (JP)

(73) Assignee: COMBI CORPORATION, Tokyo (JP)

( * ) Notice: Subject to any disclaimer, the term of this patent is extended or adjusted under 35 U.S.C. 154(b) by 382 days.

(21) Appl. No.: 13/377,465

(22) PCT Filed: Jun. 12, 2009

(86) PCT No.: PCT/JP2009/060780
§ 371 (c)(1),
(2), (4) Date: Jan. 19, 2012

(87) PCT Pub. No.: WO2010/143300
PCT Pub. Date: Dec. 16, 2010

(65) Prior Publication Data
US 2012/0104712 A1    May 3, 2012

(51) Int. Cl.
B62B 7/06 (2006.01)
B60T 1/00 (2006.01)
B60B 33/00 (2006.01)
B62B 7/08 (2006.01)
B62B 9/08 (2006.01)
B62B 5/04 (2006.01)
B62B 7/14 (2006.01)

(52) U.S. Cl.
CPC ............... B62B 7/062 (2013.01); B60T 1/005 (2013.01); B62B 5/0461 (2013.01); B60B 33/0078 (2013.01); B60B 33/0086 (2013.01); B60B 33/0092 (2013.01); B60B 2200/47 (2013.01); B60Y 2200/83 (2013.01); B62B 7/086 (2013.01); B62B 7/145 (2013.01); B62B 9/082 (2013.01); B62B 9/087 (2013.01); B62B 2205/20 (2013.01)

(58) Field of Classification Search
CPC ...... Y10T 16/195; B62B 9/082; B62B 9/087; B62B 5/0461; B62B 5/0433; B60B 33/0049; B60B 33/0057; B60B 33/0086
USPC ............. 280/647, 650, 47.38; 188/31, 19, 20, 188/69; 16/35 R
See application file for complete search history.

(56) References Cited

U.S. PATENT DOCUMENTS 1,764,914 A * 6/1930 Vande .......................... 280/643
4,805,259 A * 2/1989 Kassai .......................... 16/35 R
5,232,071 A * 8/1993 Kawanabe ................... 188/1.12
5,368,133 A * 11/1994 Yang .......................... 188/1.12

(Continued)

FOREIGN PATENT DOCUMENTS

CN     2782505 Y    5/2006
EP   0 422 376 A1    4/1991

(Continued)

Primary Examiner — J. Allen Shriver, II
Assistant Examiner — Emma K Frick
(74) Attorney, Agent, or Firm — Birch, Stewart, Kolasch & Birch, LLP

(57) ABSTRACT

A carrier for holding a wheel unit, which is easy and simple to handle (operate), and is capable of exactly switching a condition in which a rotation of a rear wheel is restricted, and a condition in which the rotation of the rear wheel is allowed is proposed. The carrier includes: a body; a sliding member capable of being slid in one direction and held on one of a first holding position and a second holding position; an urging member urging the sliding member along the one direction. The position on which the sliding member is held after the sliding member has been returned by an urging force of the urging member, is alternately changed between the first holding position and the second holding position.

11 Claims, 27 Drawing Sheets

(56) References Cited

U.S. PATENT DOCUMENTS

| | | | | |
|---|---|---|---|---|
| 5,865,457 | A * | 2/1999 | Knabusch et al. | 280/304.1 |
| 6,360,851 | B1 * | 3/2002 | Yang | 188/1.12 |
| 6,443,468 | B1 * | 9/2002 | Eros | 280/47.38 |
| 7,708,119 | B2 * | 5/2010 | Chen | 188/19 |
| 8,418,314 | B2 * | 4/2013 | Lai | 16/35 R |
| 8,540,059 | B2 * | 9/2013 | Li et al. | 188/20 |
| 2005/0006185 | A1 | 1/2005 | Kassai et al. | |
| 2013/0112509 | A1 * | 5/2013 | Henry | 188/20 |

FOREIGN PATENT DOCUMENTS

| | | |
|---|---|---|
| EP | 1 688 336 A2 | 8/2006 |
| JP | 63-8353 U | 1/1988 |
| JP | 63-82675 U | 5/1988 |
| JP | 63-176701 U | 11/1988 |
| JP | 2005-14894 A | 1/2005 |
| JP | 2005-278982 A | 10/2005 |
| JP | 2008-296902 A | 12/2008 |
| TW | 391404 A | 5/2000 |

* cited by examiner

CARRIER AND STROLLER

TECHNICAL FIELD

The present invention relates to a carrier for holding a wheel unit. In addition, the present invention relates to a stroller for carrying a baby.

BACKGROUND ART

Strollers for carrying a baby have been conventionally, generally used. Almost all of the strollers have a front leg and a pair of rear legs, and thus have a three-wheel structure or a four-wheel structure. A caster for rotatably and turnably holding a wheel is attached to the front leg, and a carrier for rotatably holding a wheel is attached to each rear leg. A brake of the stroller of this type is configured to restrict the rotation of the two rear wheels held by the pair of rear legs (for example, JP2008-296902A).

As represented by JP2008-296902A, a brake mechanism of general strollers is configured to restrict the rotation of a wheel, by operating a lever that is swingably held on a rear wheel carrier. However, when the swing-type brake mechanism held on the carrier is operated by hoot, the operation lacks reliability. Thus, such a brake mechanism is needed to be operated by hand.

Meanwhile, in order to operate the brake mechanism by hand, the operator (caregiver) must squat down. In this case, the operator looks away from the baby placed on the stroller, during the operation of the brake mechanism. It is undesirable to look away from the baby, from the viewpoint of safety.

DISCLOSURE OF INVENTION

The object of the present invention is to provide a carrier for holding a wheel unit, which is easy and simple to handle (operate), and is capable of exactly switching a condition in which a rotation of a rear wheel is restricted, and a condition in which the rotation of the rear wheel is allowed.

In order to restrict the rotation of the two rear wheels held by the pair of rear legs, JP2008-296902A uses a brake mechanism horizontally extending between the pair of rear legs. According to the brake mechanism of JP2008-296902A, the condition of the two rear wheels can be controlled by one operation. However, since the brake mechanism horizontally extending between the pair of rear legs is likely to come into contact with the leg of an operator (caregiver) who steers the stroller, the maneuverability of the stroller might be impaired. Although it is possible to separately dispose brake mechanisms on the pair of rear wheels, to operate the two brake mechanisms is annoying. It is significantly desired that the present invention can deal with this problem.

A carrier according to the present invention is a carrier for holding a wheel unit including a wheel and an axle rotatably holding the wheel, comprising: a body for holding the axle of the wheel unit; a sliding member capable of being slid in one direction with respect to the body, the sliding member being configured to be held on one of a first holding position and a second holding position which is located nearer to one side along the one direction than the first holding position; an urging member supported on the body, the urging member being configured to urge the sliding member to the body from the one side to the other side along the one direction; and a restriction engagement member attached to the sliding member, the restriction engagement member being configured to be engaged with the wheel unit so as to restrict a rotation of the wheel with respect to the axle, when the sliding member is held on one of the first holding position and the second holding position, and being configured to be disengaged from the wheel unit so as to allow the rotation of the wheel with respect to the axle, when the sliding member is held on the other of the first holding position and the second holding position; wherein the sliding member is configured such that the position on which the sliding member is held after the sliding member has been returned from the one side to the other side by an urging force of the urging member, is alternately changed between the first holding position and the second holding position, for each time when the sliding member is slid from the other side toward the one side along the one direction.

In the carrier according to the present invention, one of the body and the sliding member may include a surface which is substantially in parallel with the one direction and has a linearly extending groove; supported on the other of the body and the sliding member may be an insertion member whose distal end is located in the groove, with a displacement of the insertion member toward the one direction being restricted; the groove may include a path including a first groove path extending from a first turning position to a second turning position that is located on a position nearer to the other side than the first turning position in the one direction, a second groove path extending from the second turning position to a third turning position that is located on a position nearer to the one side than the second turning position in the one direction, a third groove path extending from the third turning position to a fourth turning position that is located on a position nearer to the other side than the third turning position in the one direction, and a fourth groove path extending from the fourth turning position to the first turning position that is located nearer to the one side than the fourth turning position in the one direction; and the groove and the insertion member may be configured such that the insertion member arrives at the first to fourth turning positions in this order, so as to circulate in the groove.

In addition, in the carrier according to the present invention, when no external force is applied to the sliding member, the groove and the insertion member may be configured to be located on the first turning position or the third turning position, by the urging force of the urging member.

In addition, in the carrier according to the present invention, the first turning position and the third turning position may be located between the second turning position and the fourth turning position, in a direction perpendicular to the one direction, in the surface having the groove.

In addition, in the carrier according to the present invention, in an area of the groove where the first groove path and the second groove path are merged, a depth of the groove of the second groove path may be greater than a depth of the groove of the first groove path, so that a step along the second groove path is formed, the step enabling that the insertion member having arrived at the second turning position is then guided to the third turning position along the second groove path; in an area of the groove where the second groove path and the third groove path are merged, a depth of the groove of the third groove path may be greater than the depth of the groove of the second groove path, so that a step along the third groove path is formed, the step enabling that the insertion member having arrived at the third turning position is then guided to the fourth turning position along the third groove path; in an area of the groove where the third groove path and the fourth groove path are merged, a depth of the groove of the fourth groove path may be greater than the depth of the groove of the third groove path, so that a step along the fourth groove path is formed, the step enabling that the insertion member having arrived at the fourth turning position is then guided to the first turning position along the fourth groove path; and in an area of the groove where the fourth groove path and the first groove path are merged, the depth of the groove of the first groove path may be greater than the depth of the groove of the fourth groove path, so that a step along the first groove path is formed, the step enabling that the insertion member having arrived at the first turning position is then guided to the second turning position along the first groove path.

Further, in the carrier according to the present invention, the surface having the groove and the insertion member may be pressed toward each other, and a distal end of the insertion member may be in contact with the bottom surface of the groove.

Further, in the carrier according to the present invention, the sliding member may be configured such that the position on which the sliding member is held after the sliding member has been returned from the one side to the other side by the urging force of the urging member, is alternately changed between the first holding position and the second holding position, for each time when the sliding member is slid to a position nearest to the one side within the slidable range along the one direction.

Further, in the carrier according to the present invention, the sliding member may be provided with an operation part through which an external force for pressing the sliding member from the other side to the one side can be applied, and the operation part may be positioned outside the body, and is moved in the one direction in conjunction with the restriction engagement member.

A first stroller according to the present invention is a stroller comprising: a frame structure including a front leg and a pair of rear legs; and a carrier according to claim 20, the carrier being attached to at least one of the rear legs.

A second stroller according to the present invention is a stroller comprising: a frame structure including a front leg and a pair of rear legs; a first carrier according to claim 1, the carrier being attached to one of the rear legs; and a second carrier for holding a wheel unit including a wheel and an axle for rotatably holding the wheel, the second carrier being attached to the other of the rear legs; wherein: the second carrier includes a body for holding the axle of the wheel unit, a sliding member supported on the body, the sliding member being capable of being slid between a first holding position and a second holding position, and a restriction engagement member attached to the sliding member, the restriction engagement member being configured to be engaged with the wheel unit so as to restrict a rotation of the wheel with respect to the axle, when the sliding member is held on one of the first holding position and the second holding position, and being configured to be disengaged from the wheel unit so as to allow the rotation of the wheel with respect to the axle, when the sliding member is held on the other of the first holding position and the second holding position; and there is provided a transmission mechanism that extends between the sliding member of the first carrier and the sliding member of the second carrier, the transmission mechanism being configured to move the sliding member of the second carrier in conjunction with the movement of the sliding member of the first carrier.

BRIEF DESCRIPTION OF THE DRAWINGS

FIG. 20(a) is a view showing a first rear wheel unit, and FIG. 20(b) is a view showing a second rear wheel unit.

MODE FOR CARRYING OUT THE INVENTION

Figure 1:
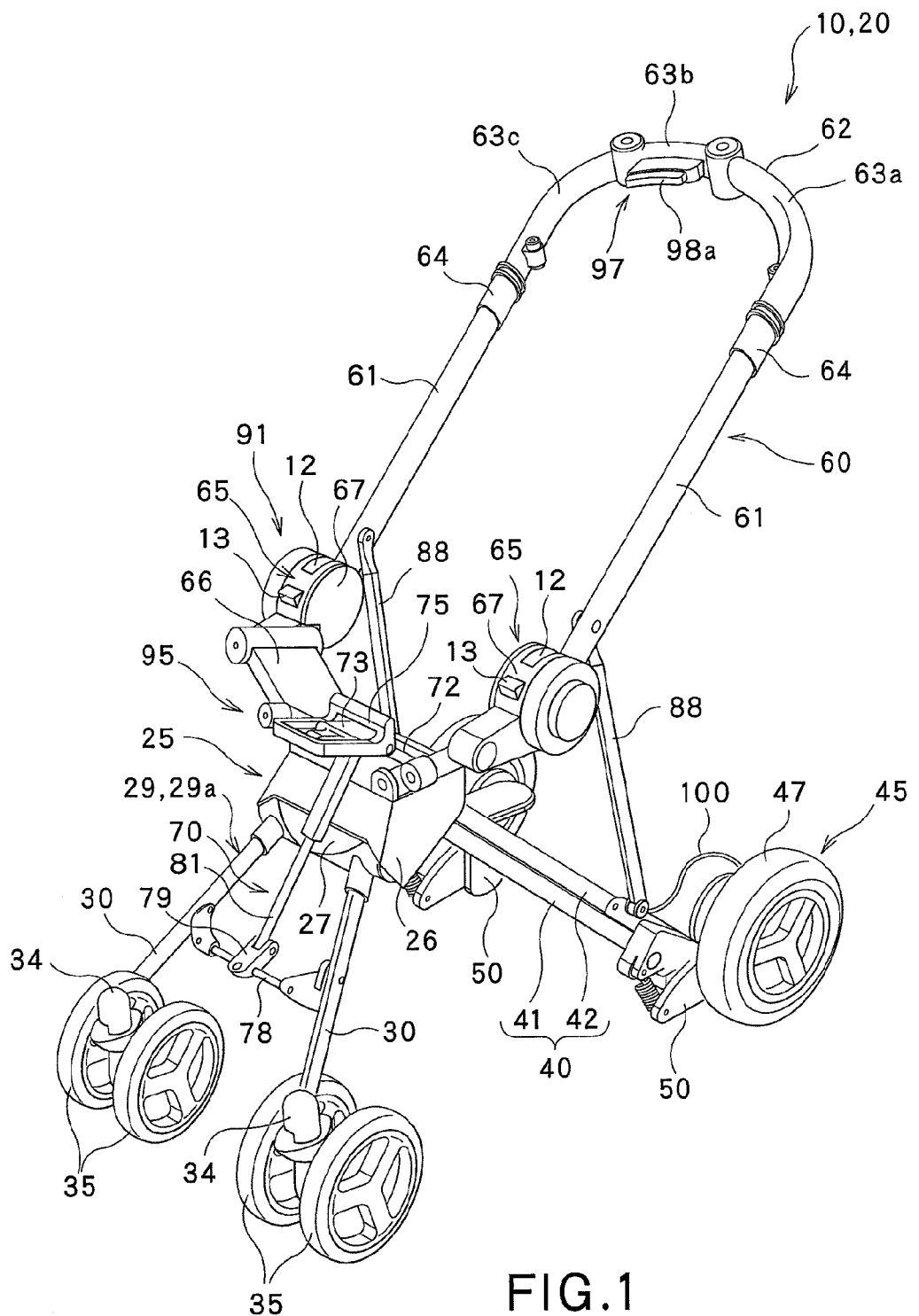
FIG. 1 is a perspective view showing a condition in which a vehicle body of a stroller in one embodiment of the present invention is unfolded (used condition).

An embodiment of the present invention will be described with reference to the drawings.

FIGS. 1 to 36 are view for explaining an embodiment of the stroller according to the present invention. FIGS. 1 to 7 show an overall structure of the stroller. As shown in FIGS. 1 to 7, a stroller 10 in this embodiment includes a vehicle body 20, and a seat 130 detachably attached to the vehicle body 20. The vehicle body 20 includes a core member 25 located on a substantially central part, a front leg 30 and a rear leg 40 supported on the core member 25, and a handle member 60 supported on the core member 25 through an arm member 65. A caster 34 including a front wheel 35 is held on a lower end of the front leg 30. A rear wheel unit 45 including a rear wheel 47 is held on a lower end of the rear leg 40 through a carrier 50.

In this embodiment, the vehicle body 20 is configured to be foldable. To be specific, the vehicle body 20 can be deformed between a used condition (unfolded condition) in which the handle member 60, the front leg 30 and the rear leg 40 are radially extended from the core member 25, and a folded condition in which the handle member 60, the front leg 30 and the rear leg 40 are rotated (swung) to be folded with respect to the core member 25. The vehicle body 20 has a rear-leg link member 88 that associates the swinging motion of the rear leg 40 and the rotating motion of the handle member 60 with each other, and a front-leg link mechanism 70 that associates the swinging motion of the front leg 30 and the rotating motion of the handle member 60 (rotating motion of the arm member 65 supporting the handle member 60) with each other.

In the stroller 10 in this embodiment, an operator (e.g., a caregiver of a baby) can steer the stroller 10 by gripping the handle member 60, such that the side of the front leg 30 of the stroller 10 faces the front of a traveling direction.

In this specification, the terms "front (forward)", "rear (back)", "up (above)", "down (low, below)", "back and forth direction", and "up and down direction" with respect to the stroller mean, unless otherwise specified, "front (forward)", "rear (back)", "up (above)", "down (low, below)", "back and forth direction", and "up and down direction", with respect to an operator steering the unfolded stroller 10. More specifically, the "back and forth direction" of the stroller 10 corresponds to a direction connecting a lower left part and an upper right part in a plane of FIG. 1, and a right and left direction in a plane of FIG. 3. Unless otherwise specified, the "front" is a side to which the operator steering the stroller 10 faces. The lower left side in the plane of FIG. 1 and the left side of the plane of FIG. 3 correspond to the front side of the stroller 10. The "up and down direction" of the stroller 10 is a direction perpendicular to the back and forth direction, and is a direction perpendicular to the ground on which the stroller 10 rests. Thus, when the ground surface is a horizontal surface, the "up and down direction" represents a vertical direction. The "width direction" or the "vehicle width direction" is a lateral direction, which is perpendicular both to the "back and forth direction" and the "up and down direction".

The vehicle body 20 of the stroller 10 is described at first. As shown in mainly in FIGS. 1 to 9, the vehicle body 20 of the stroller 10 in this embodiment, more specifically, the core member 25, the front leg 30, the rear leg 40, the arm member 65 and the handle member 60, has a substantially symmetric configuration about a plane along the back and forth direction passing through a center in the vehicle width direction.

As shown in FIGS. 1 to 4, in the vehicle body 20 of the stroller 10 in the unfolded condition, the core member 25 is located on a substantially central part. As shown mainly in FIGS. 6, 9, 10 and 11, the core member 25 has a base part 26 as a body part, and a front-leg rotatably-supporting part 27 detachably fixed on the base part 26 through a fixing tool 25a. The base part 26 of the core member 25 is formed of an aluminum forged article, for example, and has a high rigidity. The front-leg rotatably-supporting part 27 is a member that rotatably supports the front leg 30. The front-leg rotatably-supporting part 27 and the front leg 30 supported thereon constitute a front leg unit 29, which will be described below.

Next, the front leg 30 and the rear leg 40 connected to the core member 25 are described.

Figure 2:
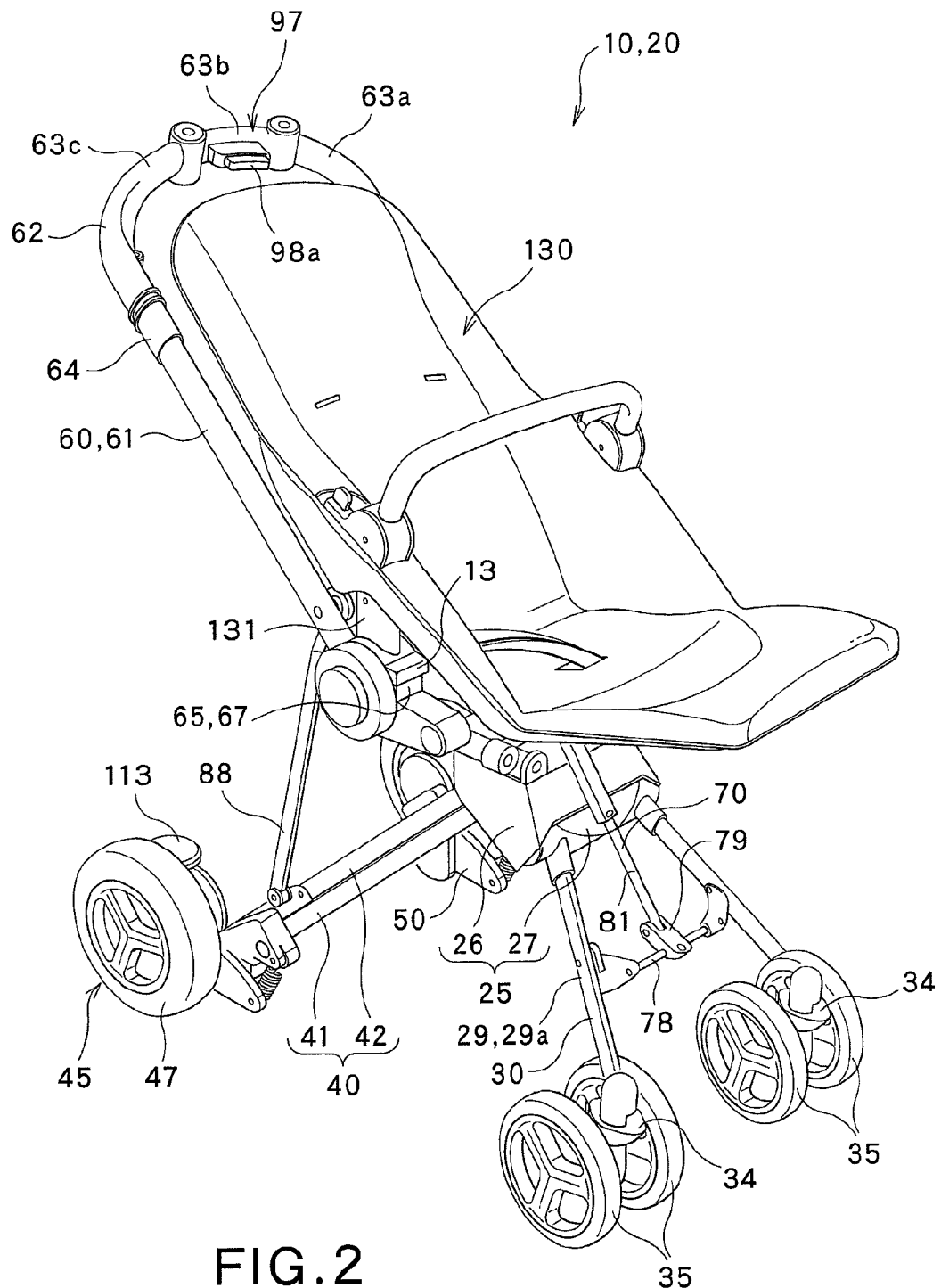
FIG. 2 is a perspective view showing the vehicle body of FIG. 1 in which a seat is assembled therein.
Figure 3:
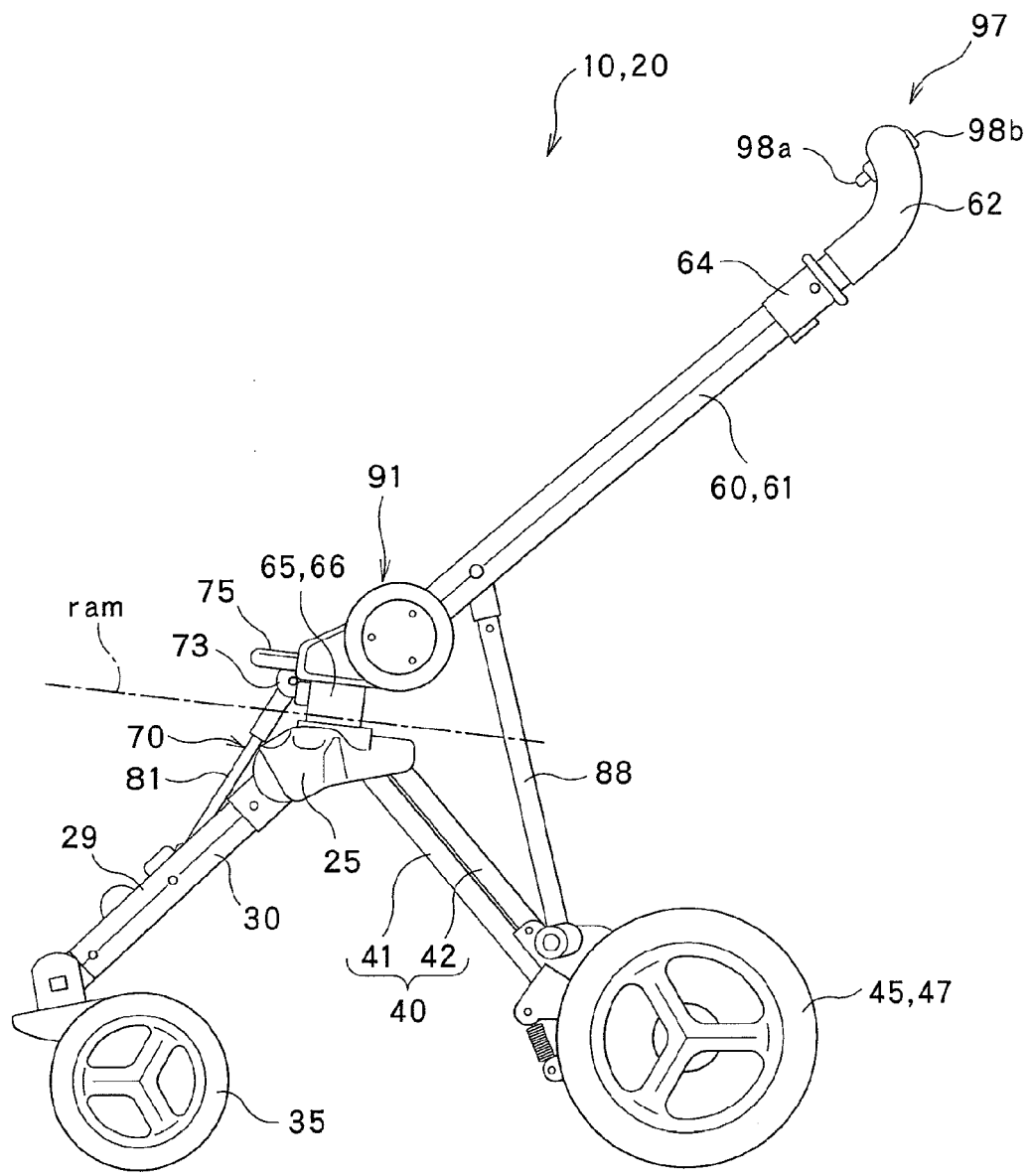
FIG. 3 is a side view showing the condition in which the vehicle body of the stroller of FIG. 1 is unfolded.

The vehicle body 20 shown in FIGS. 1 to 9 is provided with the pair of front legs 30 that are arranged in the vehicle width direction. As shown in FIG. 3, in the unfolded state, each of the front legs 30 extends downward from the core member 25, such that an end of the front leg 30 connected to the core member 25 is positioned rearward in the back and forth direction, as compared with an end of the front leg 30 which is opposite to the former end and is connected to the front wheel unit 35. As shown in FIGS. 1 and 2, in the used condition, the pair of front legs 30 are inclined such that a separation distance therebetween in the vehicle width direction increases, as a certain point on the front leg 30 separates away from the core member 25.

As described above, the caster 34 is attached to the lower end of each front leg 30. The caster 34 rotatably supports the pair of front wheels 35. In addition, the caster 34 turnably supports axles of the pair of front wheels 35. In the vehicle body 20 of the stroller 10 shown in FIGS. 1 to 7, a separation distance between the pair of front wheels 35 supported on the lower ends of the respective front legs 30 is significantly smaller than the separation distance between the lower ends of the pair of front legs 30. Thus, it can be said that the stroller 10 in this embodiment shown in FIGS. 1 to 7 is structured as a four-wheel vehicle in terms of functional classification.

Figure 8:
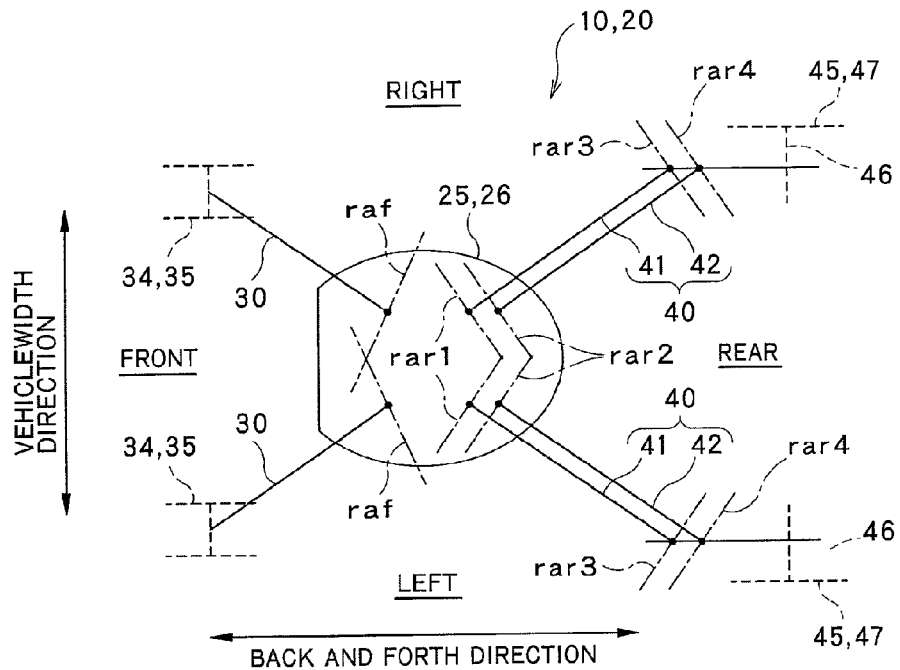
FIG. 8 is a top view schematically showing a part of the vehicle body of the stroller of FIG. 1.

Each of the front legs 30 is rotatably (swingably) connected to the core member 25. As shown in FIG. 8, a rotating axis line (swinging axis line) raf of each front leg 30 is extended such that an outside in the vehicle width direction (a side distant from the center of the vehicle body 20 of the stroller 10 in the vehicle width direction) is located rearward in the back and forth direction, as compared with an inside in the vehicle width direction (a side near to the center of the vehicle body 20 of the stroller in the vehicle width direction). Thus, the respective front legs 30 can be swung with respect to the core member 25, from a condition in which the front legs 30 extend from the core member 25 to the front in the back and forth direction and to the outside in the vehicle width direction (a condition shown in FIGS. 1 to 4), to a condition in which the front legs 30 extend substantially downward from the core member 25 (a condition shown in FIGS. 5 and 6). As shown in FIG. 6, the rotating axis line (swinging axis line) raf of each front leg 30 extends such that the outside in the vehicle width direction is located downward in the up and down direction, as compared with the inside in the vehicle width direction. As a result, even when the respective front legs 30 are rotated with respect to the core member 25, the front wheels 35 supported on the lower ends of the front legs 30 can be maintained in a posture that is parallel with a posture before being rotated. Namely, as shown in FIG. 6, also in the folded condition in which the front legs 30 are rotated to be folded with respect to the core member 25, the rotating axis lines of the pair of front wheels 35 supported on the each front leg 30 through the caster 34 extend in parallel with the ground surface.

Figure 4:
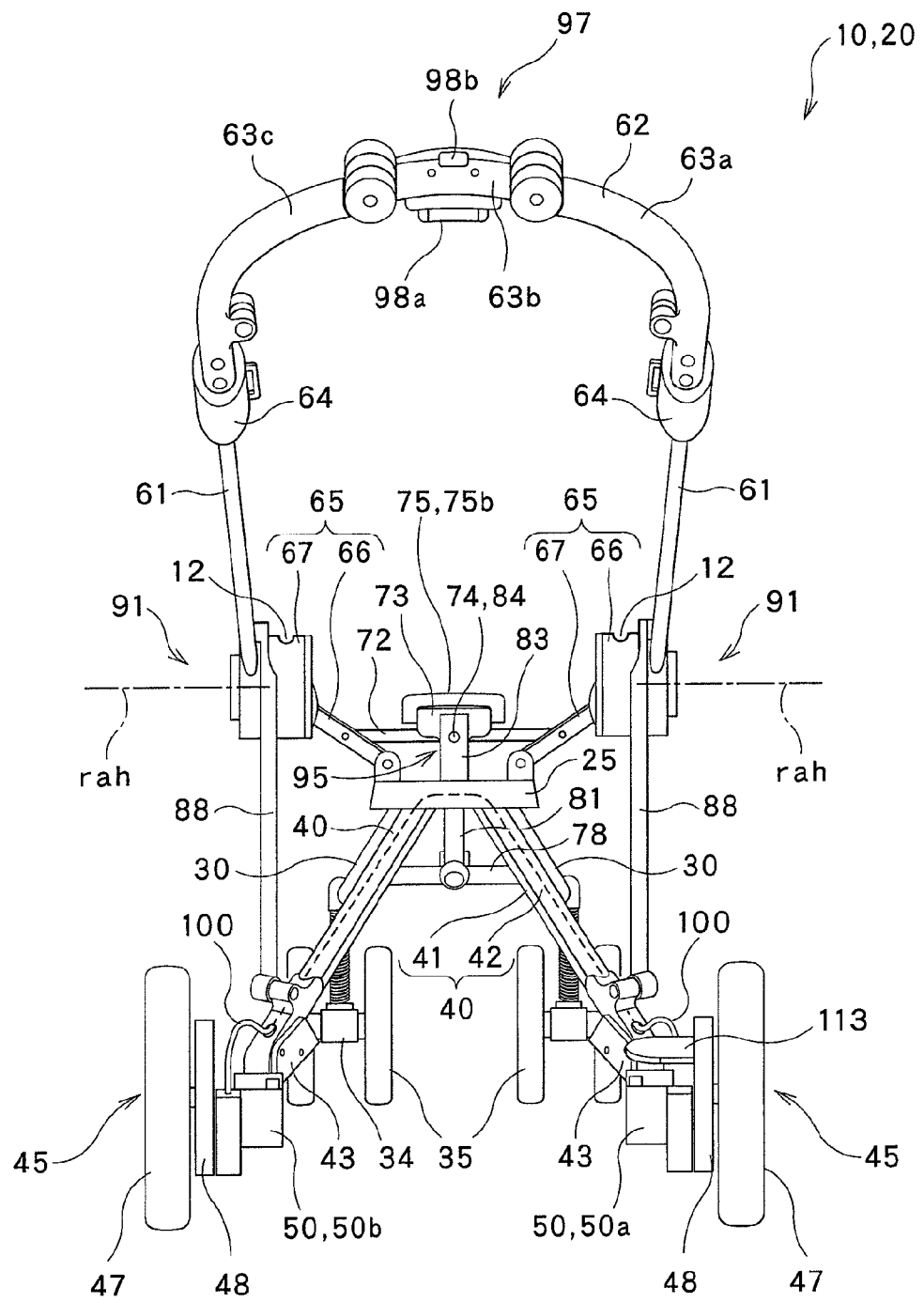
FIG. 4 is a view showing from the rear the condition in which the vehicle body of the stroller of FIG. 1 is unfolded.

Next, the rear leg 40 is described. The vehicle body 20 shown in FIGS. 1 to 7 is provided with the pair of rear legs 40 that are arranged in the vehicle width direction, similarly to the front legs 30. As shown in FIG. 3, in the unfolded condition, each of the rear legs 40 extends downward from the core member 25, such that an end of the rear leg 40 connected to the core member 25 is positioned forward in the back and forth direction, as compared with an end of the rear leg 40 which is opposite to the former end and is connected to the rear wheel unit 45. As shown in FIG. 4, in the used condition, the pair of rear legs 40 are inclined such that a separation distance therebetween in the vehicle width direction increases, as a certain point on the rear leg 40 separates away from the core member 25.

Each of the rear legs 40 is rotatably (swingably) connected to the core member 25. As shown in FIG. 8, rotating axis lines (swinging axis lines) rar1 and rar2 of each rear leg 40 extend such that an outside in the vehicle width direction is positioned forward in the back and forth direction, as compared with an inside in the vehicle width direction. Thus, the respective rear legs 40 can be swung with respect to the core member 25, from a condition in which the rear legs 40 extend from the core member 25 to the rear in the back and forth direction and to the outside in the vehicle width direction (the condition shown in FIGS. 1 to 4), to a condition in which the rear legs 40 extend substantially downward from the core member 25 (the condition shown in FIGS. 5 and 6).

The rear wheel carrier 50 is attached to a lower end of each rear leg 30. The rear wheel carrier 50 supports the rear wheel unit 45 including the rear wheel 47. The rear wheel carrier 50 and the rear wheel unit 45 will be described later.

Figure 9:
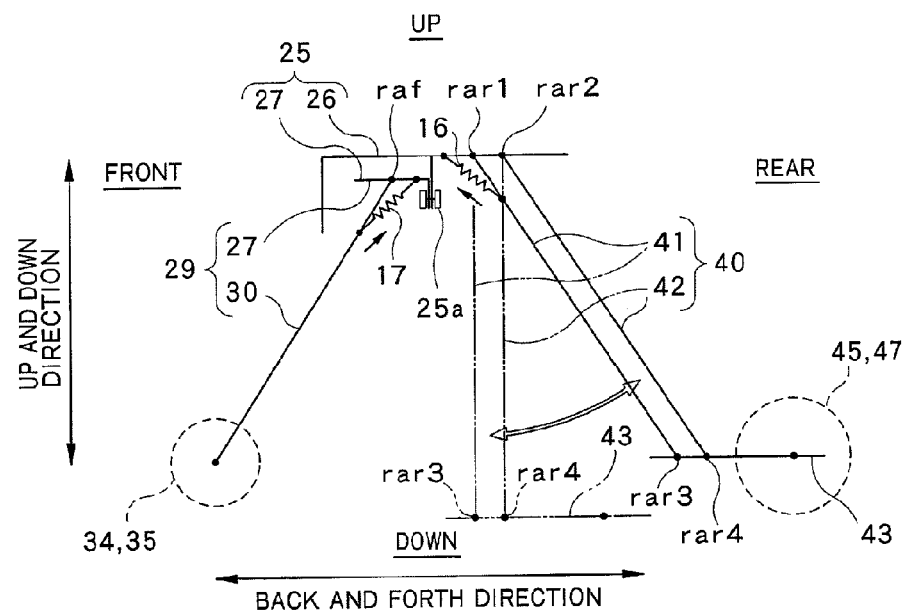
FIG. 9 is a side view schematically showing a part of the vehicle body of the stroller of FIG. 1.

In the vehicle body 20 of the illustrated stroller 10, each of the rear legs 40 includes a first rear-leg element 41 and a second rear-leg element 42 located in parallel with each other. As shown in FIG. 9, the first rear-leg element 41 and the second rear-leg element 42 are connected, at their upper ends, to the core member 25 about parallel rotating axis lines (swinging axis lines) rar1 and rar2. In addition, the first rear-leg element 41 and the second rear-leg element 42 are rotatably (swingably) connected, at their lower ends, to a carrier support member 43 supporting the rear wheel carrier 50, about parallel rotating axis lines (swinging axis lines) rar3 and rar4 (see FIG. 18). The rotating axis lines rar1 and rar2 of the rear-leg elements 41 and 42 with respect to the core member 25 and the rotating axis lines rar3 and rar4 of the rear-leg elements 41 and 42 with respect to the carrier support member 43 are in parallel with each other. In addition, as schematically shown in FIG. 9, these rotating axis lines rar1, rar2, rar3 and rar4 are located on positions defining a parallelogram. As a result, even when the respective rear legs 40 are rotated with respect to the core member 25, the rear wheels 47 supported on the lower parts of the rear legs 40 can be maintained in a posture that is parallel with a posture of the rear wheels 47 before being rotated. Namely, as shown in FIG. 7, even when the rear legs 40 are rotated with respect to the core member 25 so as to be folded, the rotating axis lines of the rear wheels 47 supported on the respective rear legs 40 through the rear wheel carriers 50 extend in parallel with the ground surface.

Figure 5:
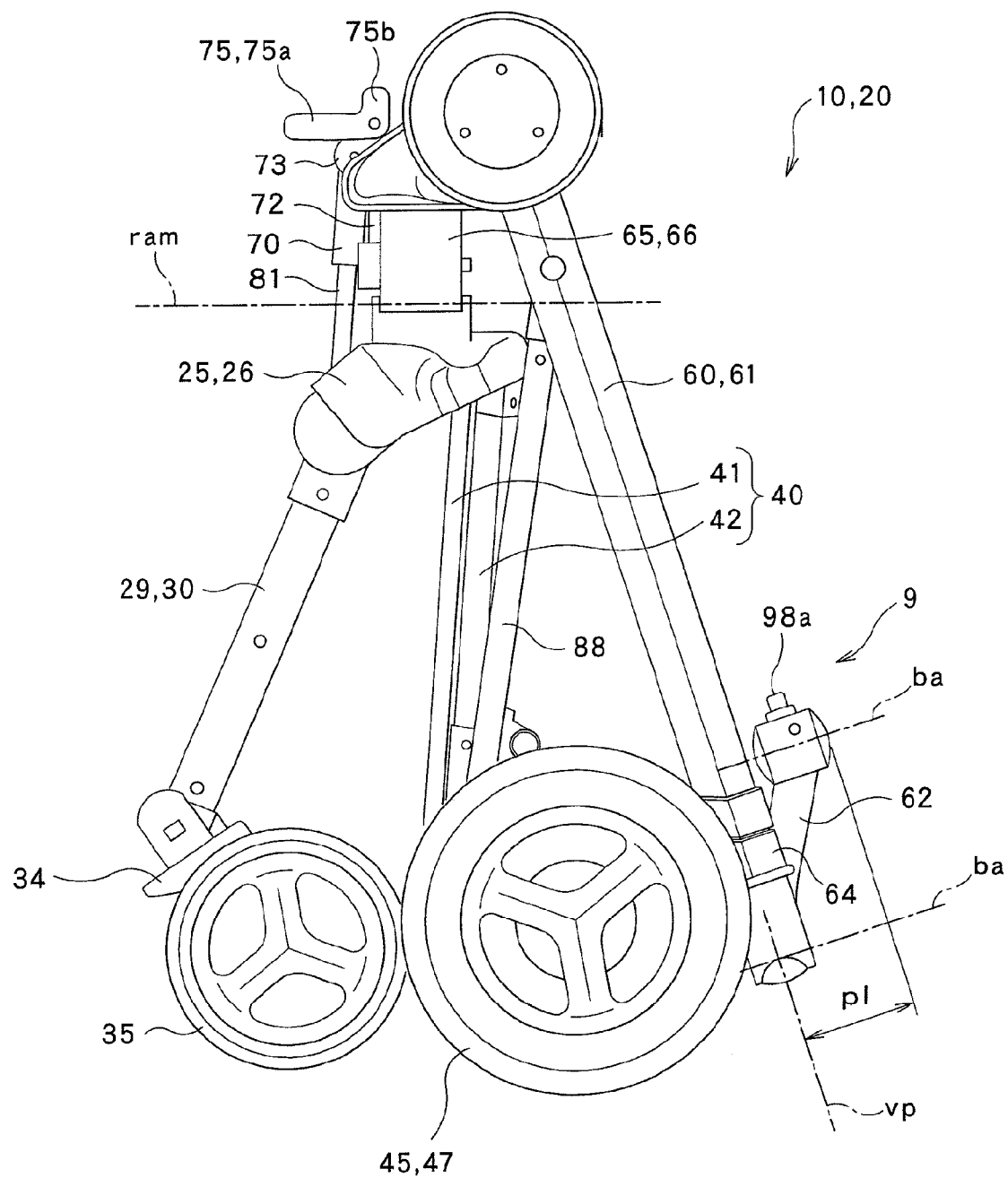
FIG. 5 is a side view showing a condition in which the vehicle body of the stroller of FIG. 1 is folded.
Figure 6:
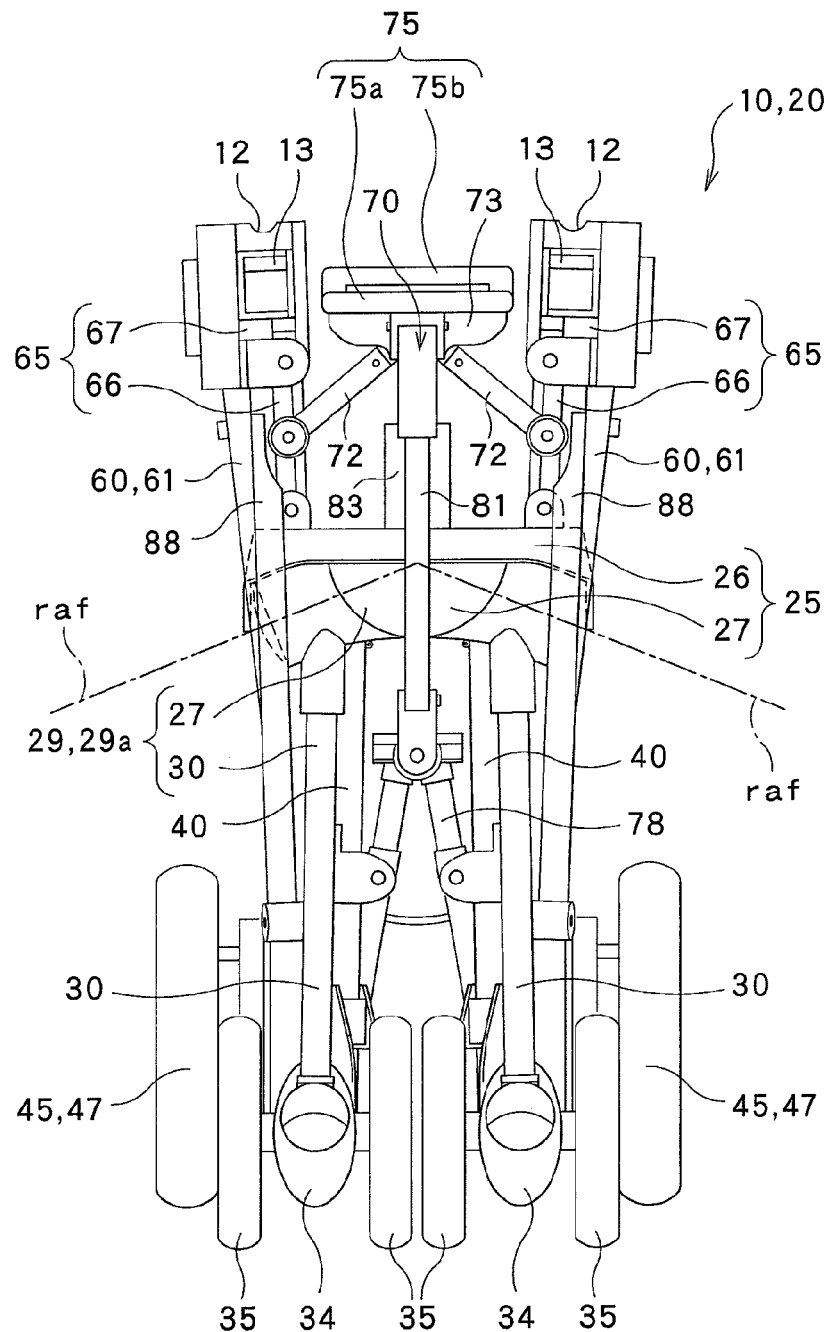
FIG. 6 is a view showing from the front the condition in which the vehicle body of the stroller of FIG. 1 is folded.
Figure 7:
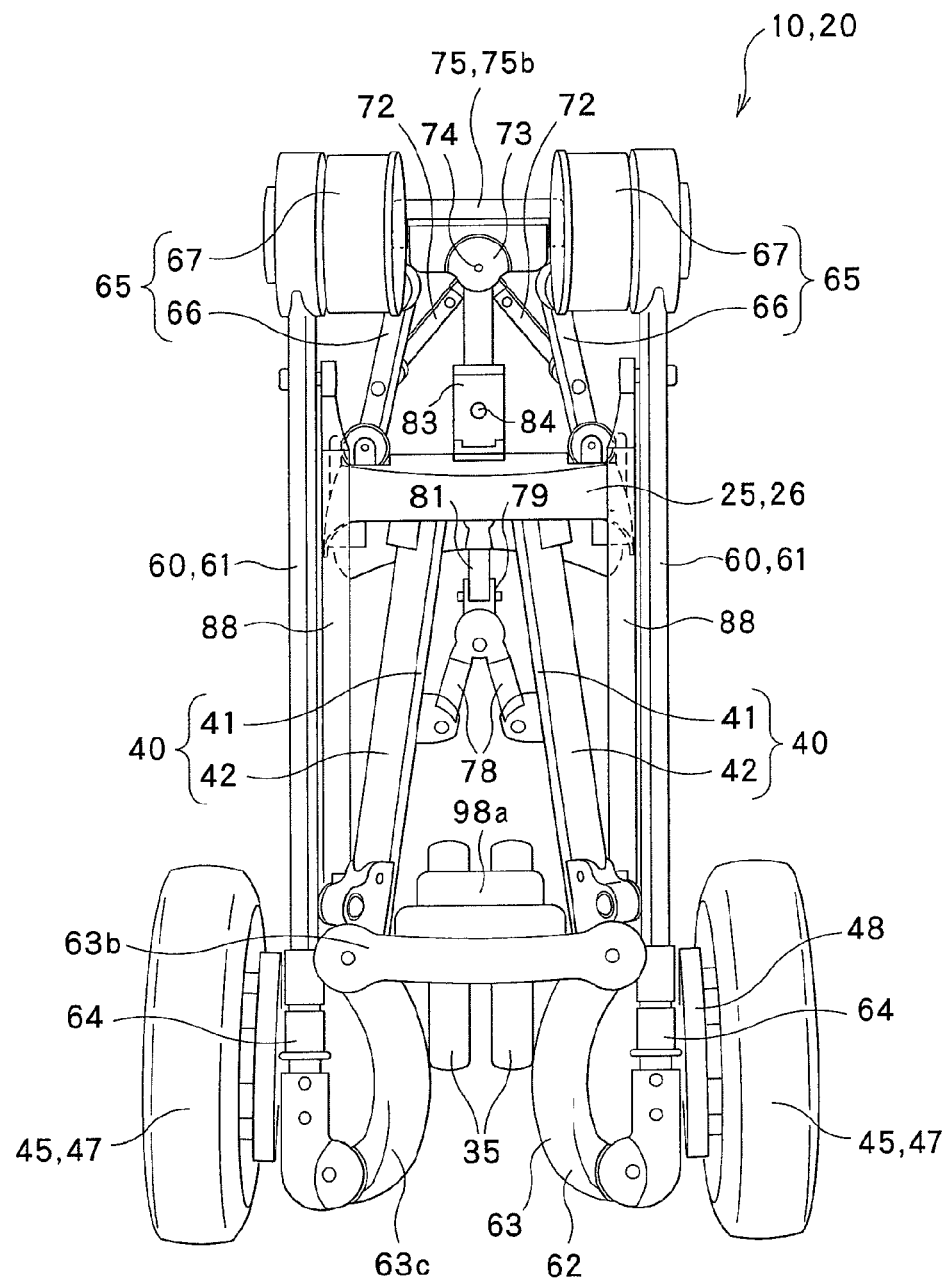
FIG. 7 is a view showing from the rear the condition in which the vehicle body of the stroller of FIG. 1 is folded.

As shown in FIGS. 5 to 7, in the stroller 10 of this embodiment, when the vehicle body 20 of the stroller 10 is deformed from the used condition to the folded condition, the left front leg 30, the right front leg 30, the left rear leg 40 and the right rear leg 40, which extend from the core member 25, are swung with respect to the core member 25 so as to come close to each other. In other words, the left front leg 30, the right front leg 30, the left rear leg 40 and the right rear leg 40 are swung with respect to the core member 25, such that angles defined thereamong are decreased. To put it differently, the pair of front legs 30 and the pair of rear legs 40 are swung with respect to the core member 25, such that their ends distant from the core member 25 are located on positions close to each other.

As a result, as shown in FIG. 5, in the folded condition, the front legs 30 and the rear legs 40 extend downward from the core member 25 closely to each other. Thus, dimensions of the stroller 10 in the back and forth direction can be reduced in the folded condition. In addition, as shown in FIG. 6, in the folded condition, the pair of front legs 30 extend downward from the core member 25 closely to each other. Similarly, as shown in FIG. 7, in the folded condition, the pair of rear legs 40 extend downward from the core member 25 closely to each other. Thus, dimensions of the stroller 10 in the vehicle width direction can be reduced in the folded condition.

Next, the handle member 60 and the arm member 65 are described.

As described above, as shown in FIGS. 1 to 7, the handle member 60 is swingably connected to the core member 25 through the pair of arm members 65 which are arranged in the vehicle width direction. The handle member 60 includes a pair of handle extending parts 61 which are arranged in the vehicle width direction, and a bendable bending part 62 coupling the pair of handle extending parts 61. In this embodiment, one end of the handle extending part 61 is rotatably (swingably) connected to the arm member 65, and the other end of the handle extending part 61 is connected to the bending part 62.

As shown in FIGS. 3 and 4, for example, an area of the handle extending part 61 on the side of the arm member 65 is rotatably connected to one end of the rear-leg link member 88. The other end of the rear-leg link member 88 is connected to the second rear-leg element 42 of the rear leg 40 in an area on the side of the carrier support member 43. The rear-leg link member 88 is configured to link the rotating motion of the rear legs 40 with respect to the core member 25 and the rotating motion of the pair of handle extending parts 61. As shown in FIG. 5, in the folded condition, the handle member 60 extends downward from the arm member 65 supported on the core member 25.

Namely, when the vehicle body 20 of the stroller 10 is deformed from the used condition to the folded condition, the handle member 60 and the rear legs 40 are swung with respect to the core member 25 so as to come close to each other. In other words, the handle member 60 and the rear leg 40 are swung with respect to the core member 25, such that an angle defined therebetween, which is seen from the lateral side, is decreased. To put it differently, the handle member 60 and the rear leg 40 are swung such that an end of the handle member 60 distant from the arm member 65 and the end of the rear leg 40 distant from the core member 25 are located on positions close to each other.

As described above, when the vehicle body 20 of the stroller 10 is deformed from the used condition to the folded condition, the ends of the pair of rear legs 40 on the side of the carrier support members 43 in the vehicle width direction come close to each other, so that the separation distance between the ends is narrowed (see FIGS. 4 and 7). When the separation distance between the pair of rear legs 40 becomes narrow, the separation distance between the pair of rear-leg link members 88, which are respectively connected to the pair of rear legs 40, becomes narrow. In this embodiment, in order that the pair of handle extending parts 60 come close to each other in accordance with the motion of the pair of rear legs 40 coming close to each other in the vehicle width direction and the motion of the pair of rear-leg link members 88 coming close to each other in the vehicle width direction, the handle member 60 and the arm members 65 supporting the handle member 60 are structured as described below.

Each of the arm members 65 has a rotating base 66 rotatably (swingably) connected to the core member 25, and a handle support member 67 supported on the rotating base 66 and connected to the handle member 60. The handle support member 67 is rotatably connected to one end of the handle extending part 61 of the handle member 60.

Figure 13:
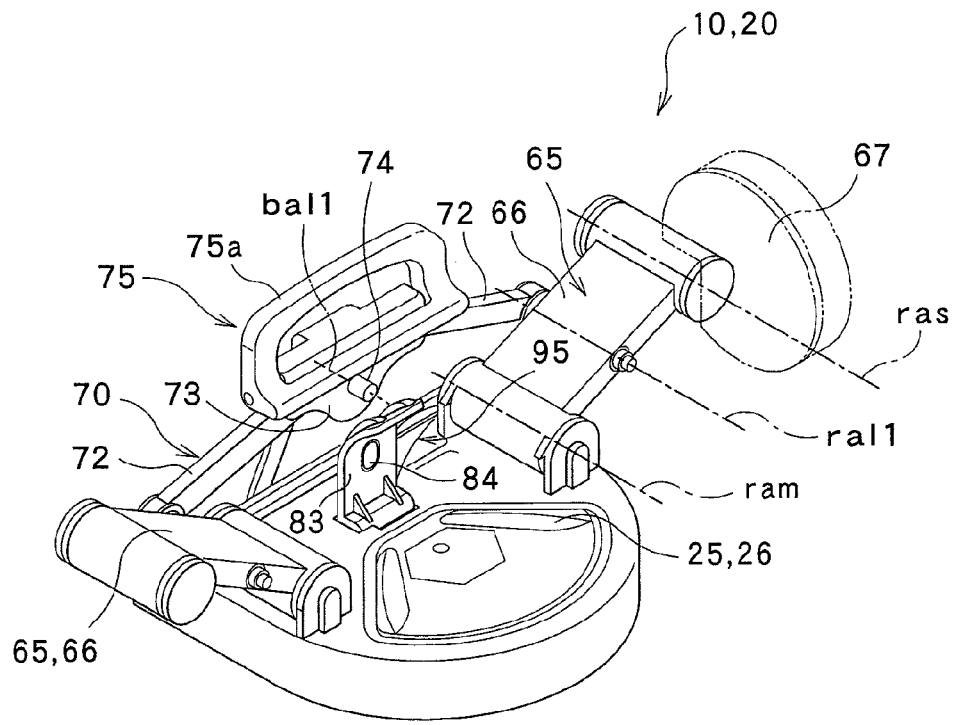
FIG. 13 is a view corresponding to FIG. 12, showing from the rear a part of the stroller in the condition shown in FIG. 11.

A rotating axis line ram of each rotating base 66 with respect to the core member 25 crosses the vehicle width direction, and is oriented substantially in the back and forth direction (see, e.g., FIGS. 3 and 13). Thus, the pair of arm members 65 can be rotated with respect to the core member 25, such that a separation distance between the pair of arm members 65 on the opposite side to the core member 25, i.e., a separation distance between the handle support members 67 in the vehicle width direction is varied.

In addition, the handle support member 67 can be rotated with respect to the rotating base 66 about an axis line ras that is in parallel with the rotating axis line ram of the rotating base 66 with respect to the core member (see, e.g., FIG. 13). Thus, the arm members 65 can be rotated with respect to the core member 25 so that the pair of handle support members 67 come close to each other or separate away from each other in the vehicle width direction, while a rotating axis line rah of the handle extending parts 61 with respect to the pair of handle support members 67 being linearly maintained in parallel with the horizontal direction. Due to the structure of the arm member 65, the separation distance between the ends of the pair of handle extending parts 61 near to the arm members 65 in the vehicle width direction can be narrowed in the folded condition, in accordance with the motion of the rear legs 40 coming close to each other in the vehicle width direction.

As described above, the ends of the pair of handle extending parts 61 distant from the arm members 65 are coupled to each other by the bendable bending part 62. Since the bending part 62 is bent in the folded condition, the separation distance between the ends of the pair of handle extending parts 61 distant from the arm members 65 in the vehicle width direction can be narrowed.

Owing to the structures of the arm members 65 and the handle member 60, in the folded condition, the handle member 60 and the rear legs 40 are located such that the end of the handle member 60 distant from the arm members 65 and the ends of the rear legs 40 distant from the core member 25 are located on positions closer to each other not only in the back and forth direction but also in the vehicle width direction, as compared with the used condition.

Figure 17:
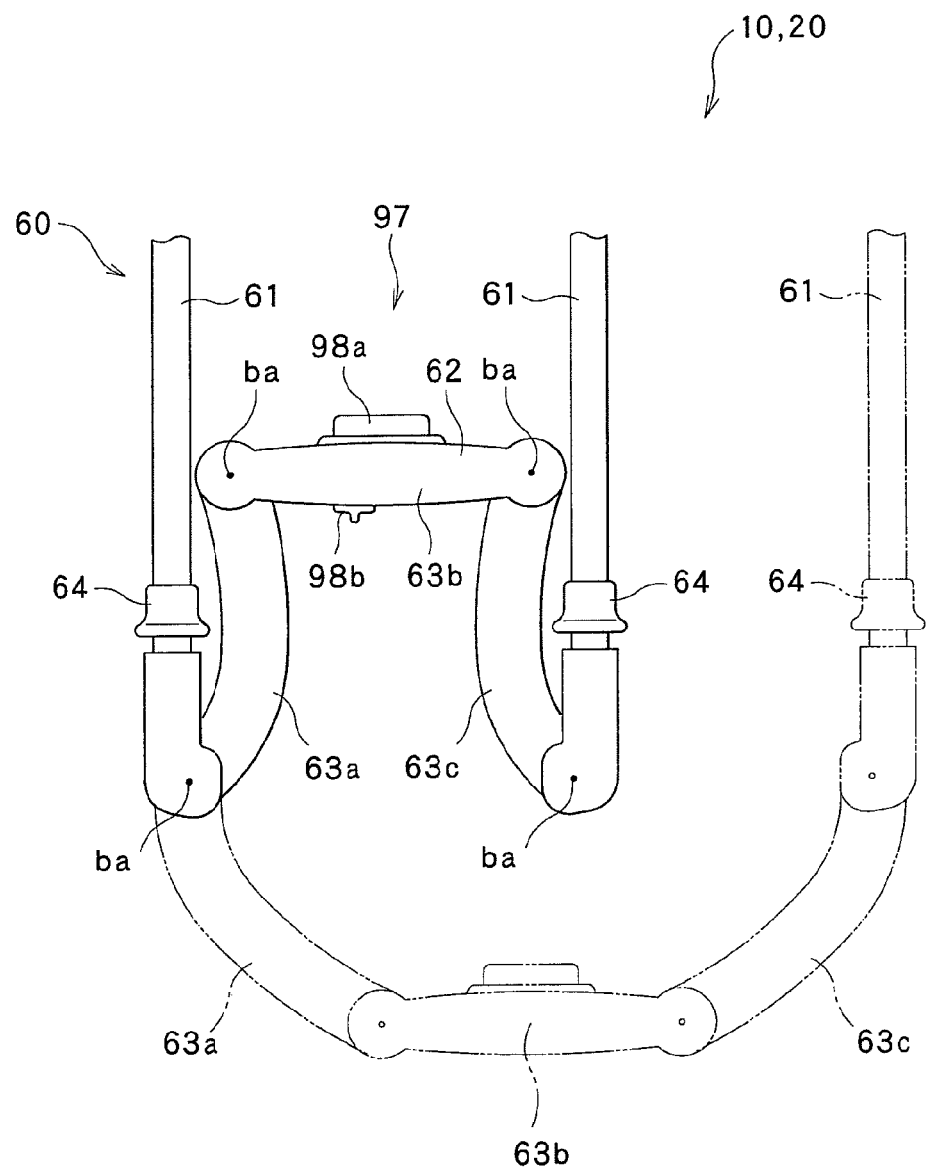
FIG. 17 is a view showing from the front the handle member in the folded condition, and the handle member before it is folded.

As shown in FIG. 17, the bending part 62 has a first bending part 63a and a third bending part 63c, which are connected to the ends of the pair of handle extending parts 61 distant from the arm members 65, and a second bending part 63b disposed between the first bending part 63a and the third bending part 63c. Ends of the first to third bending parts 63a, 63b and 63c are connected to each other, such that the first to third bending parts 63a, 63b and 63c can be rotated respectively.

As shown in FIGS. 1 to 4, in the used condition, the bending part 62 extends from the pair of handle extending parts 61 toward a side distant from the arm members 65. On the other hand, as well shown in FIG. 7, in the folded condition, the bending part 62 is bent so as to protrude toward a side close to the arm members 65. Thus, as shown in FIG. 17, in the folded condition, the dimensions of the handle member can be reduced not only in the vehicle width direction but also in the up and down direction as well as the back and forth direction. Namely, the dimensions of the handle member 60 in the folded condition can be reduced not only in the vehicle width direction but also in the back and forth direction, while simultaneously maintaining the dimensions of the handle member 60 in the used condition to be a suitable length in consideration of the maneuverability and so on.

As shown in FIG. 5, a bending axis line ba of the bending part 62 is substantially perpendicular to a virtual plane vp including the pair of handle extending parts 61. Thus, as shown in FIG. 5, in the folded condition, a protruding amount pl of the bending part 62 from the virtual plane vp including the pair of handle extending parts 61 will not become substantially larger than that in the used condition. Also from this point, the dimensions of the stroller 10 in the folded condition can be effectively reduced in the back and forth direction and in the up and down direction.

Figure 10:
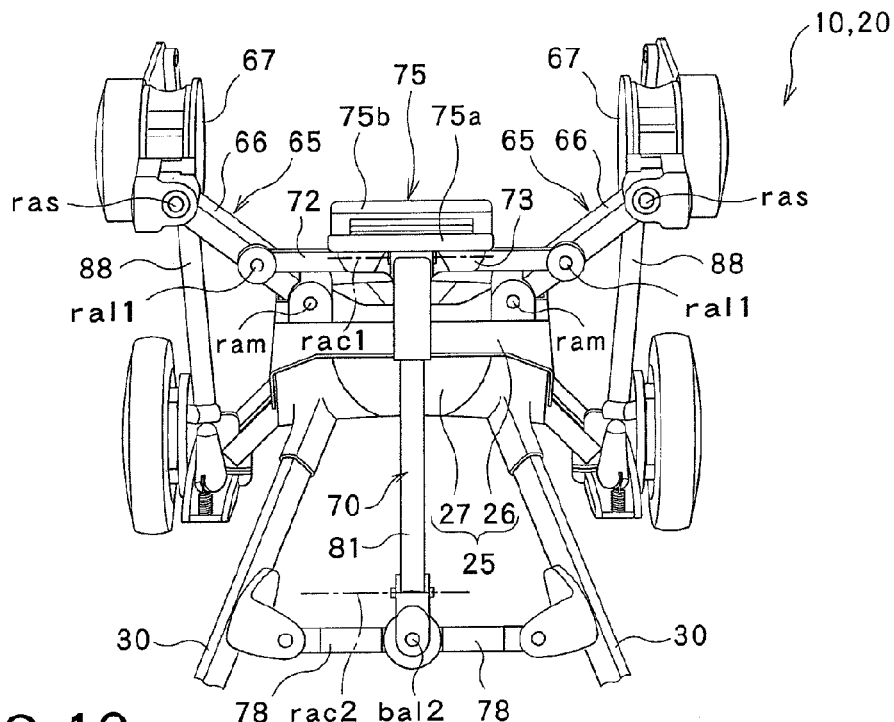
FIG. 10 is a view showing from the front the unfolded vehicle body of the stroller.
Figure 11:
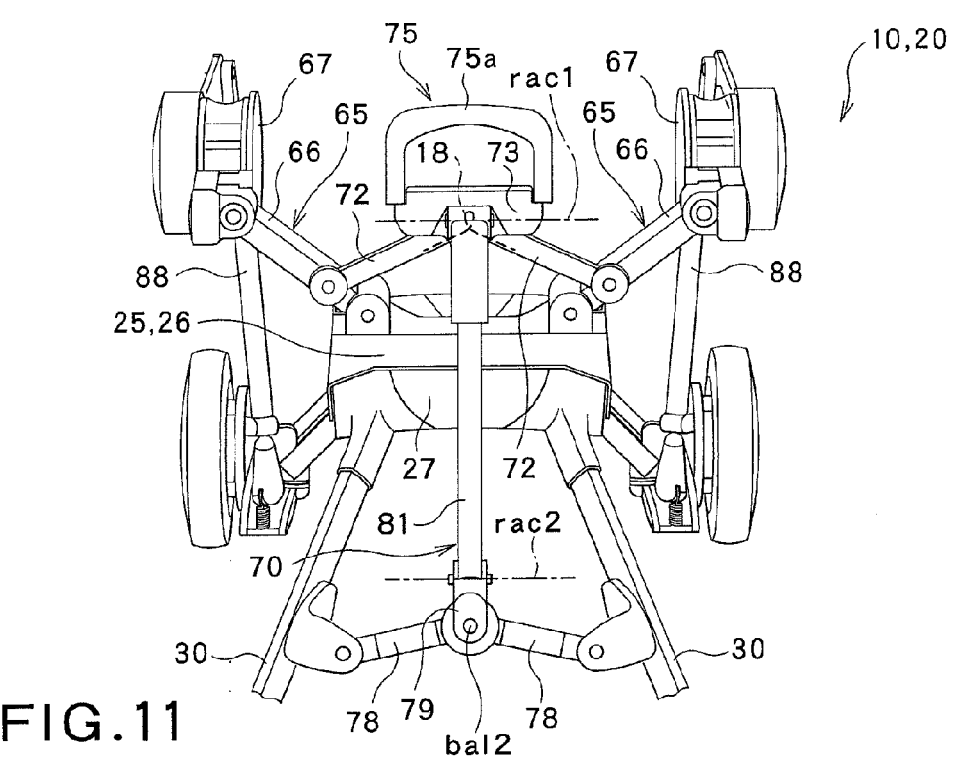
FIG. 11 is a view corresponding to FIG. 10, showing the vehicle body of the stroller in which a folding operation is started.

In addition, as well shown in FIGS. 10 and 11, in the vehicle body 20 of the stroller 10 in this embodiment, the front-leg link mechanism 70 is disposed between the pair of arm members 65 and front legs 30. The front-leg link mechanism 70 couples the pair of arm members 65 to each other and the front legs 30 to each other, and is configured to link the swinging motion of the front legs 30 and the rotating motion of the pair of arm members 65.

As shown in FIGS. 10 and 11, the front-leg link mechanism 70 includes an arm-member coupling link 72 that couples the pair of arm members 65, a front-leg coupling link 78 that couples the pair of front legs 30, and a connection link 81 extending between the arm-member coupling link 72 and the front-leg coupling link 78.

As shown in FIG. 10, in the used condition, the arm-member coupling link 72 horizontally, linearly extends between the rotating bases 66 of the pair of arm members 65. The arm-member coupling link 72 is rotatably connected to the rotating bases 66, and is configured to be bendable at a center portion thereof. Thus, when the pair of rotating bases 66 are rotated with respect to the core member 25 from the used condition to the folded condition, the arm-member coupling link 72 is bent, in accordance with the motion of the pair of rotating bases 66 coming close to each other.

In particular, as shown in FIG. 13, in this embodiment, a bending axis line bal1 of the arm-member coupling link 72 and a rotating axis line rail of the arm-member coupling link 72 with respect to the rotating base 66 extend substantially in parallel with the rotating axis line ram of the rotating base 66 with respect to the core member 25. Thus, in accordance with the rotating motion of the rotating base 66 with respect to the core member 25, the arm-member coupling link 72 can be smoothly bent.

The arm-member coupling link 72 and the connection link 81 are coupled to each other through a first connector 73. The first connector 37 is located above the arm-member coupling link 72 to restrict the arm-member coupling link 72 from being bent to protrude toward the side of the front leg 30 (to protrude downward). Thus, as shown in FIG. 11, the arm-member coupling link 72 is bent such that the center portion thereof protrudes upward, and is prevented from being bent reversely.

Similarly, as shown in FIG. 10, in the used condition, the front-leg coupling link 78 horizontally, linearly extends between the pair of front legs 30. The front-leg coupling link 78 is rotatably connected to the front legs 30, and is configured be bendable at the center portion thereof. Thus, when the pair of front legs 30 are rotated with respect to the core member 25 from the used condition to the folded condition, the front-leg coupling link 78 is bent, in accordance with the motion of the pair of front legs 30 coming close to each other.

As described above, the connection link 81 is coupled to the bendable position or a position adjacent to the bendable position of the arm-member coupling link 72 through the first connector 73. One end of the connection link 81 is rotatably (swingably) connected to the first connector 73. As can be understood from FIGS. 11 and 13, a rotating axis line rac1 of the connection link 81 with respect to the first connector 73 is perpendicular to the bending axis line bal1 of the arm-member coupling link 72. As shown in FIGS. 10 and 11, the connection link 81 is coupled to the bendable position or a position adjacent to the bendable position of the front-leg coupling link 78 through a second connector 79. The other end of the connection link 81, which is opposite to the one end connected to the first connector 73, is rotatably (swingably) connected to the second connector 79. As shown in FIG. 11, a rotating axis line rac2 of the connection link 81 with respect to the second connector 79 is perpendicular to the bending axis line bal2 of the front-leg coupling link 78.

The vehicle body 20 of the stroller 10 in this embodiment is provided with a mechanism for maintaining the used condition, i.e., the unfolded condition. As described below, the condition maintaining mechanism is configured to restrict displacement or deformation of the elements constituting the vehicle body 20 of the stroller 10. As has been described above, the displacement or deformation of the elements constituting the vehicle body 20 of the stroller 10 are associated with each other, through the front-leg link mechanism 40 and the rear-leg link member 88. Thus, by restricting the displacement or deformation of a certain constituent element by means of the condition maintaining mechanism, it is possible to restrict the folding motion of the stroller 10 so as to maintain the stroller 10 in the used condition.

Figure 15:
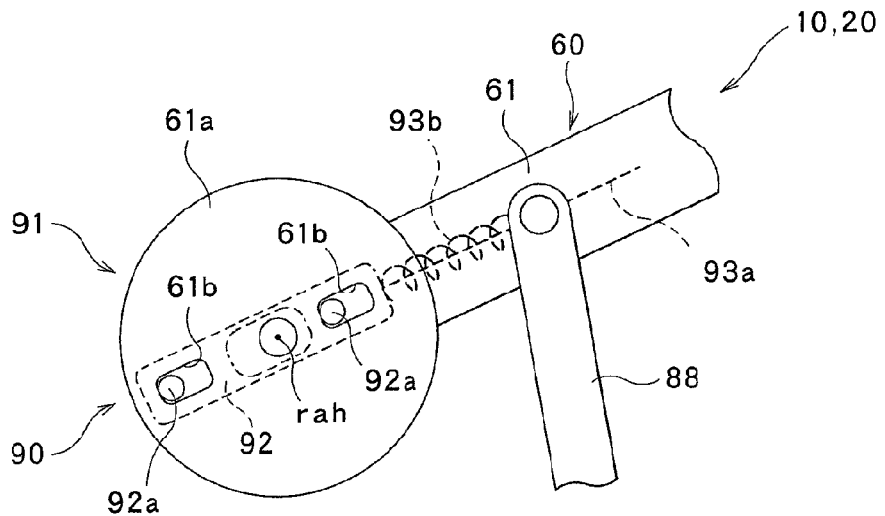
FIG. 15 is a view for explaining a first condition maintaining mechanism of the stroller of FIG. 1, the view showing an end of a handle member, with the handle member being detached.
Figure 16:
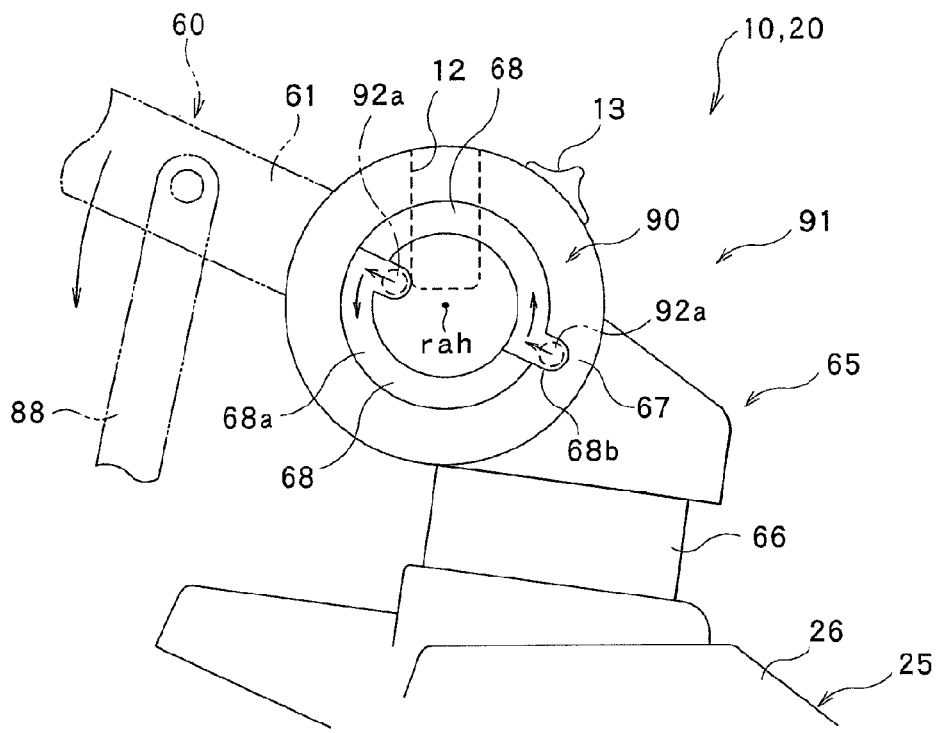
FIG. 16 is a view for explaining the first condition maintaining mechanism of the stroller of FIG. 1, the view showing a part to which the handle member is attached, with the handle member being detached.

As a first condition maintaining mechanism 91, there is provided a mechanism for restricting the rotating motion of the handle member 60 with respect to the arm members 65. As shown in FIGS. 15 and 16, the first condition maintaining mechanism 91 is structured to include a restriction slider 92 disposed in an end 61*a* of the handle extending part 61 on the side of the arm member 65, and a groove 68 formed in the handle support member 67 of the arm member 56 facing the end 61*a* of the handle extending part 61.

The restriction slider 92 includes a pair of restriction projections 92*a* protruding from the end 61*a* of the handle extending part 61 toward the handle support member 67 of the arm member 56 facing the end 61*a*. In the handle extending part 61, the restriction slider 92 can be slid with resect to the handle extending part 61. The restriction slider 92 is urged by a compression spring 93*b* disposed in the handle extending part 61, from a side of the bending part 62 toward a side away therefrom, inside the handle extending part 61. The restriction slider 92 can be moved, against the urging force of the compression spring 93*b*, by first changeover switches 64 disposed on end areas of the respective handle extending parts 61 on the side of the bending part 62. Each of the first changeover switches 64 is disposed on an outer surface of the handle extending part 61, such that the first changeover switch 64 can be slid with respect to the handle extending part 61. A coupling member 93*a* that couples the first changeover switch 64 and the restriction slider 92 extends in the handle extending part 61.

On the other hand, the groove 68 formed in the handle support member 67 includes restriction grooves 68*b* for receiving the restriction projection 92*a* of the restriction slider 92, which is moved by the urging from the compression spring 93*b*, and a guide groove 68*a* for guiding the restriction projection 92*a* of the restriction slider 92, which is moved against the urging from the compression spring 93*b*. The restriction grooves 68*b* extend from the guide groove 68*a*, such that the restriction groove 68*b* is in parallel with a radial direction from the rotating axis line rah of the handle extending part 61.

Thus, when the restriction slider 92 is pressed by the compression spring 93*b* so that the restriction projections 92 are engaged with the guide grooves 68*a*, the rotating motion of the handle extending parts 61 with respect to the arm members 65 is restricted. On the other hand, when the first changeover switch 64 is operated, the restriction slider 92 is lifted upward into the guide grooves 68*a*, against the urging force of the compression spring 93*b*. In this case, the handle member 60 can be rotated with respect to the arm members 65. When the handle member 60 is rotated with respect to the arm members 65 from the folded condition up to the used condition position, the restriction projections 92*a* are pressed by the compression spring 93*b* so as to be fitted in the restriction grooves 68*b*, whereby the vehicle body 20 of the stroller 10 can be maintained in the used condition.

Figure 12:
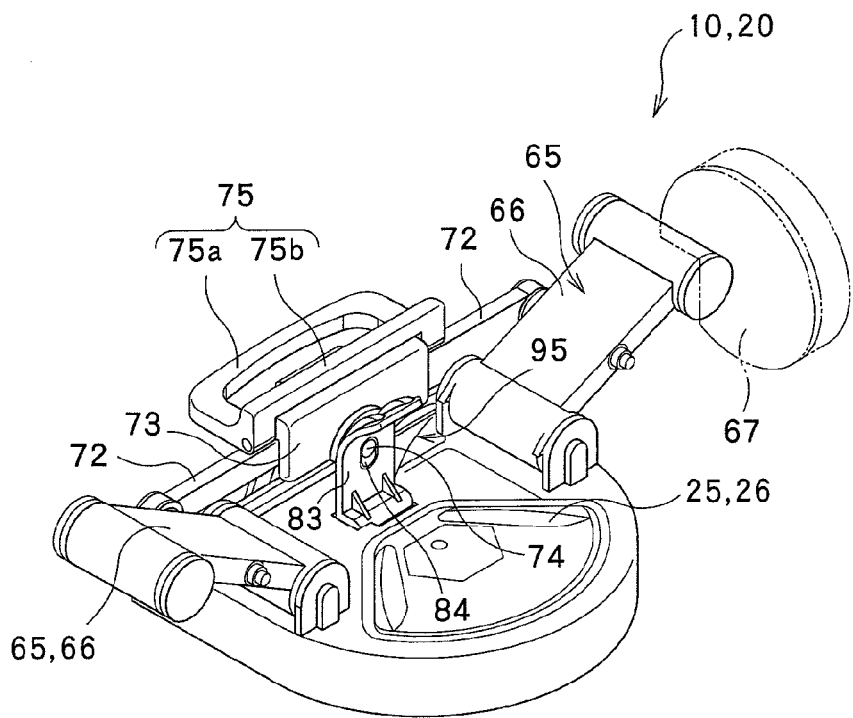
FIG. 12 is a perspective view showing from the rear a part of the stroller in the condition shown in FIG. 10.
Figure 14:
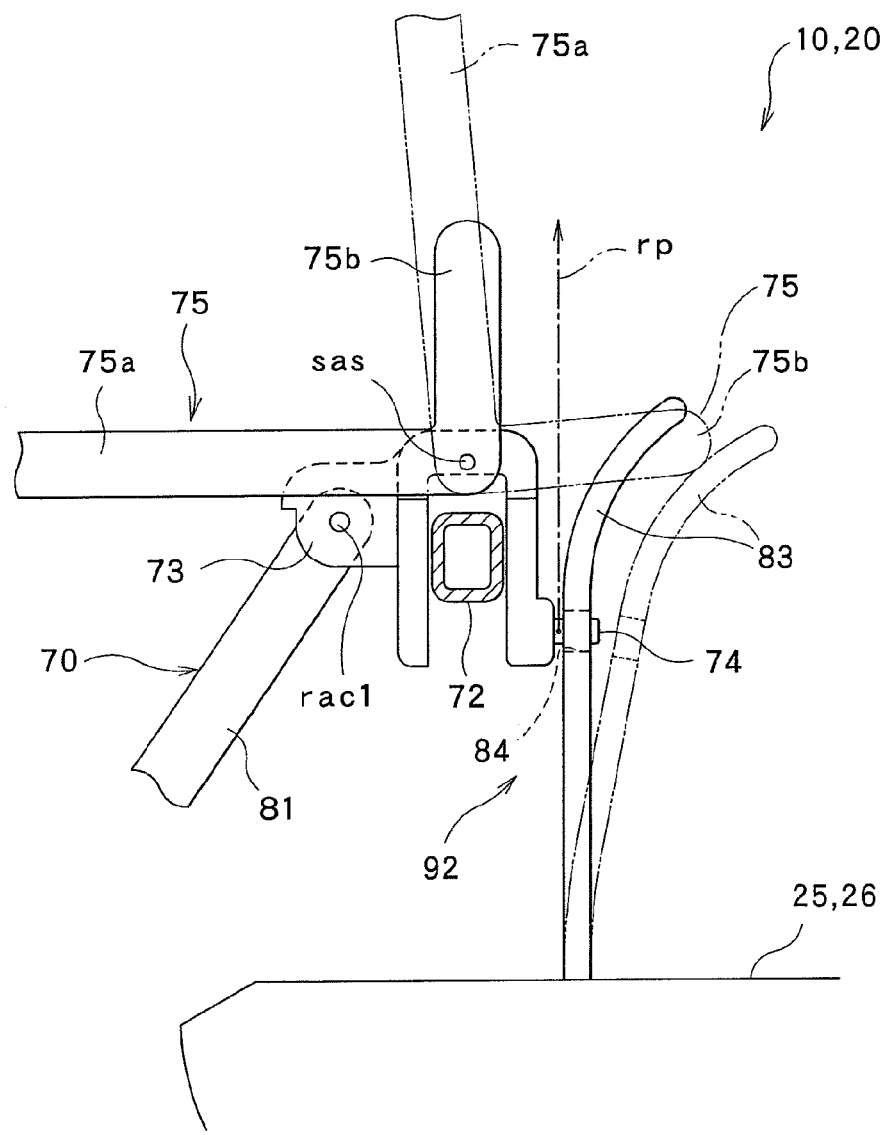
FIG. 14 is a view for explaining a second condition maintaining mechanism of the stroller of FIG. 1, the view showing from the lateral side a part of the stroller in the condition shown in FIG. 8.

Next, there is described a mechanism for restricting the rotation of the arm member 65 with respect to the core member 25, which is provided as a second condition maintaining mechanism 95. As shown in FIGS. 12 to 14, the second condition maintaining mechanism 95 includes a protrusion 74 disposed on the front-leg link mechanism 70, and a condition maintaining piece 83 in which a receiving part 84 capable of receiving the protrusion 74 is formed.

As shown in FIGS. 12 to 14, the protrusion 74 protrudes from a rear side surface of the first connector 73. The condition maintaining piece 83 is disposed on the core member 25 and stands up from the core member 25. When the stroller is in the used condition, the condition maintaining piece 83 is located on the core member 25 on a position facing the first connector 73 of the front-leg link mechanism 70. To be more specific, as shown in FIGS. 12 to 14, the condition maintaining piece 83 extends substantially along a movement path rp (see FIG. 14) of the protrusion 74 along which the protrusion 74 moves when the deformation from the used condition to the folded condition is started, and warps rearward such that the condition maintaining piece 83 is gradually separated from the movement path rp of the protrusion 74. As shown in FIG. 11, the receiving part 84 is formed in the condition maintaining piece 83 on a position facing the protrusion 74 when the stroller 10 is in the used condition.

Namely, as shown in FIG. 14, under the condition in which the protrusion 74 of the front-leg link mechanism 70 is fitted in the receiving part 84 of the condition maintaining piece 83, the bending motion of the arm-member coupling link 72 is restricted. Thus, the deformation (displacement) of the front-leg link mechanism 70 as a whole is also restricted. However, the condition maintaining piece 83 is configured to be deflectable in the warping direction, i.e., in the backward direction in the back and forth direction away from the front-leg link mechanism 70 (first connector 73). Thus, as shown by the two-dot chain lines in FIG. 14, by pressing the condition maintaining piece 83 rearward (to the side away from the first connector 73 of the front-leg link mechanism 70), the condition maintaining piece 83 warps further rearward. Thus, the protrusion 74 of the front-leg link mechanism 70 is disengaged from the receiving part 84 of the condition maintaining piece 83, whereby the deformation of the arm-member coupling link 72 becomes possible.

As shown in FIG. 14, the condition maintaining piece 83 is formed of a plate-like member with a part thereof being warped. The receiving part 84 is formed in a portion in the not-warped area of the condition maintaining piece 83, which portion extends in parallel with the movement path rp of the protrusion 74 along which the protrusion 74 moves when the deformation from the used condition toward the folded condition is started. Thus, it can be effectively prevented that the protrusion 74 received in the receiving part 84 is disengaged from the receiving part 84 by an unintended external force or the like.

As shown in FIGS. 10 to 14, in this embodiment, the front-leg link mechanism 70 is provided with a swingable swinging member 75. As shown in FIG. 14, the swinging member 75 has a grip part 75*a* which can be gripped by an operator, and a release lever part 75*b* extending from the grip part 75*a* and swingable synchronically with the grip part 75*a*. The swinging member 75 is attached to the first connector 73 of the front-leg link mechanism 70. As shown in FIG. 14, a swinging axis line sas of the swinging member 75 with respect to the front-leg link mechanism 70 (first connector 73) extends in parallel with the surface of the condition maintaining piece 83 having a planar shape.

As shown in FIG. 14, the swinging member 75 is located such that the release lever part 75*b* is brought into contact with the condition maintaining piece 83 when the swinging member 75 is swung in the used condition. When an operator swings the swinging member 75 while gripping the grip part 75*a*, the release lever part 75*b* presses the condition maintaining piece 83 from the front side to the rear side. Namely, by operating the swinging member 75, the condition maintaining piece 83 is forced to be separated away from the first connector 73 of the front-leg link mechanism 70. As a result, as shown by the two-dot chain lines in FIG. 14, the protrusion 74 disposed on the front-leg link mechanism 70 can be disengaged from the receiving part 84 of the condition maintaining piece 83. In this manner, the engagement between the front-leg link mechanism 70 and the condition maintaining piece 83 is released, whereby the deformation of the front-leg link mechanism 70 becomes possible. Thus, the swinging member 75 (release lever part 75*b*) functions as a switch (second changeover switch) for operating the second condition maintaining mechanism 95.

Further, as a third condition maintaining mechanism 97, there is provided a mechanism for restricting the bending motion of the bending part 62 of the handle member 60. The bending part 62 of the handle member 60 includes the first to third bending parts 63*a*, 63*b* and 63*c* which are rotatably attached to the handle extending parts 61 and are rotatably connected to each other. A mechanism for restricting the rotating motion of the bending part 62 with respect to the handle extending parts 61, and the rotating motion between the first to third bending parts 63*a*, 63*b* and 63*c*, is assembled in the bending part 62.

As shown in FIG. 4, for example, in the stroller 10, a press button 98*a* for releasing the restriction on rotation, in other words, for allowing the rotation, is disposed on the second bending part 63*b* of the bending part 62. In addition, as shown in FIGS. 4 and 17, the second bending part 63*b* of the bending part 62 is further provided with an operation restriction switch 98*b* for restricting displacement of the press button 98*a*. Namely, in order to operate the third condition maintaining mechanism 97, it is necessary to press the press button 98*a*, with the operation restriction switch 98*b* being released. In this manner, in the used condition of the stroller 10, the bending motion of the bending part 62 is restricted by the third condition maintaining mechanism 97.

With the use of the first to third condition maintaining mechanisms 91, 95 and 97, the vehicle body 20 of the stroller 10 can be maintained in the unfolded used condition.

There is described a motion of the vehicle body 20 of the stroller 10, when the vehicle body 20 of the stroller 10 is deformed between the used condition and the folded condition. Firstly, a motion for folding the vehicle body 20 of the stroller 10 in the unfolded used condition is described.

In order to deform the vehicle body 20 of the stroller 10 from the used condition to the folded condition, the first to third condition maintaining mechanisms 91, 95 and 97 are operated. At first, for example, the third condition maintaining mechanism 97 is operated by pressing the press button 98*a* with the operation restriction switch 98*b* being released, so that the bending part 62 of the handle member 60 becomes a bendable condition. Then, for example, the bending part 67 is deformed so as to be slightly bent, whereby the bending part 62 is maintained in the rotatable condition without the need for continuously pressing the press button 98*a*.

Following thereto, the second condition maintaining mechanism 95 is operated. Specifically, as shown in FIGS. 12 and 13, the swinging member 75 is swung with respect to the front-leg link mechanism 70, with the grip part 75*a* of the swinging member 75 as the second changeover switch being gripped. As shown in FIG. 14, in accordance with the swinging motion of the swinging member 75, the release lever part 75*b* presses the condition maintaining piece 83. As a result, the protrusion 74 of the front-leg link mechanism 70 is disengaged from the receiving part (through-hole) 84 of the condition maintaining piece 83, whereby the front-leg link mechanism 70 becomes the deformable condition.

Further, the first condition maintaining mechanism 91 is operated. Specifically, the first changeover switch 64 (see, e.g., FIG. 17) is slid with respect to the handle extending part 61, so as to lift upward the restriction slider 92 (see FIG. 15) disposed in the handle extending part 61. In accordance with the movement of the restriction slider 92, the restriction projections 92*a* of the restriction slider 92 are moved in the groove 68 formed in the handle support member 67 of the arm member 65, from the restriction groove 68*b* to the guide grooves 68*a* (see FIG. 16). This enables the swinging motion of the handle member 60 (handle extending parts 61) with respect to the arm members 65 (handle support members 67).

In this manner, after the restraint for maintaining the vehicle body 20 of the stroller 10 in the used condition has been released by operating the first to third condition maintaining mechanisms 91, 95 and 97, the handle member 60 is swung with respect to the arm members in a direction close to the rear legs 40 (in the clockwise direction in the side view shown in FIG. 3). The swinging motion of the handle member 60 with respect to the arm members 65 is transmitted to the rear legs 40 by the rear-leg link member 88. As a result, in accordance with the swinging motion of the handle member 60, the rear legs 40 are swung with respect to the core member 25, such that the ends of the rear legs 40 distant from the core member 25 are moved forward (in the clockwise direction in the side view in FIG. 3).

As described above, by the rotating motion of the pair of rear legs 40 with respect to the core member 25, the rear legs 40 come close to each other so that the separation distance therebetween is narrowed. In accordance with the motion of the pair of rear legs 40 coming close to each other, the pair of handle extending parts 61 connected to the pair of rear legs 40 through the rear-leg link member 88 also come close to each other. Specifically, the rotating bases 66 are swung to come close to each other, so that in accordance with the motion of the pair of rear-leg link member 88 coming close to each other, the handle support members 67, which are connected to the ends of the pair of handle extending parts 61 on the one side, come close to each other. In addition, the bending part 62, which is connected to the ends of the pair of handle extending parts 61 on the one side, can be bent. Therefore, the pair of handle extending parts 61 come close to each other, whereby the separation distance between the pair of handle extending parts 61 in the vehicle width direction is narrowed.

As shown by the two-dot chain lines in FIG. 17, in the used condition, the bent part 62 of the handle member 60 protrudes from the other ends of the handle extending parts 61 toward the side distant from the arm members 65 (core member 25). On the other hand, as shown by the solid lines in FIG. 17, in the folded condition, the bending part 62 is bent to project from the other ends of the handle extending parts 61 toward the side close to the arm members 65 (core member 25).

Further, the motion of the pair of rotating bases 66 coming close to each other is transmitted to the pair of front legs 30 through the front-leg link mechanism 70. As shown in FIGS. 11 and 13, in accordance with the rotating motion of the pair of rotating bases 66, the arm-member coupling link 72 of the front-leg link mechanism 70 is bent to protrude upward. The upward bending motion of the arm-member coupling link 72 is transmitted to the front-leg coupling link 78 through the connection link 81, whereby the front-leg coupling link 78 is also bent to protrude upward. In accordance with the bending motion of the front-leg coupling link 78, the pair of front legs 30 are swung with respect to the core member 25, such that the pair of front-legs 30 can come close to each other in the vehicle width direction. Namely, the front legs 30 are swung with respect to the core member 25, such that the ends of the front legs 40 distant from the core member 25 are moved rearward (in the counterclockwise direction in the side view shown in FIG. 3).

In the above manner, the swinging motion of the handle member 60, the swinging motion of the front legs 30 and the swinging motion of the rear legs 40 are carried out in conjunction with each other, and the motion of the vehicle body 20 of the stroller 10 from the used condition to the folded condition is completed.

As shown in FIG. 5, in the folded condition, the rearward extension amounts of the handle member 60 and the rear leg 40 from the core member 25 in the back and forth direction are significantly smaller than those in the used condition. Similarly, the forward extension amount of the front leg 30 from the core member 25 in the back and forth direction is significantly smaller than that in the used condition. In addition, in the folded condition, the extension amounts of the handle member 60, the rear leg 40 and the front leg 30 from the core member 25 in the vehicle width direction are significantly smaller than those in the used condition. Further, in the folded condition, since the handle member 60 extends downward, the height of the stroller 10 in the up and down direction can be significantly lowered. Thus, by folding the stroller 10 from the used condition to the folded condition, the dimensions of the vehicle body 20 of the stroller 10 can be significantly reduced in the back and forth direction, in the width direction and in the up and down direction.

As described above, the bending part 62 of the handle member 60 protrudes rearward and upward from the pair of handle extending parts 61, and is bent into the space between the pair of handle extending parts 61. Thus, it is both possible to set the extension amount of the handle member 60 in the used condition to be a suitable length in consideration of the maneuverability of the stroller 10, and to sufficiently shorten the length of the handle member 60 in the folded condition so as to significantly reduce the dimensions of the stroller 10, in particular, the dimensions of the stroller 10 in the up and down direction.

As shown in FIG. 5, the swinging axis line of the bending part 62 with respect to the handle extending part 61 and the swinging axis line ba between the first to third bending parts 63a, 63b and 63c constituting the bending part 62 extend in substantially perpendicular to the virtual plane vp defined by the pair of handle extending parts 61 which are arranged in parallel. Thus, as shown in FIG. 5, the extension amount pl of the bending part 62 from the virtual plane vp, which is defined by the pair of handle extending parts 61 when the bending part 62 is bent, is not large, whereby the dimensions in the folded condition can be sufficiently reduced.

Further, as described above, the rotating axis line raf of the front leg 30 with respect to the core member 25 (see, e.g. FIGS. 8 and 9) is inclined such that the outside in the vehicle width direction is located rearward and downward of the inside in the vehicle width direction. In addition, the first rear-leg element 41 and the second rear-leg element 42 of the rear leg 40 constitute the link of a parallelogram shape, together with the carrier support member 43 and the core member 25. Thus, as shown in FIGS. 5 to 7, even in the folded condition, the front wheels 35 supported by the front legs 30 and the rear wheels 47 supported by the rear legs 40 are held in the same posture as the posture in the used condition, and the rotating axis line of the front wheel 35 and the rotating axis line of the rear wheel 47 are in parallel with those in the used condition. Thus, the vehicle body 20 of stroller 10 in the folded condition can stand up from the ground surface through the front wheels 35 and the rear wheels 47. As a result, it is remarkably easy to handle the vehicle body 20 of the stroller 10 in the folded condition. Further, the vehicle body 20 of the stroller 10 can be operated by gripping the grip part 75a of the swinging member 75, whereby the operability of the vehicle body 20 of the stroller 10 can be greatly improved.

In this embodiment, a deformation urging member that urges the change (deformation/displacement) of the vehicle body 20 from the used condition to the folded condition is assembled in the vehicle body 20 of the stroller 10. Specifically, as shown in FIG. 9, a tension spring as a first deformation urging member 16 is disposed between each rear leg 40 and the core member 25. Each of the rear legs 40 is urged by the spring as the first deformation urging member 16, such that the end of the rear leg 40 distant from the core member 25 is moved forward in the back and forth direction, i.e., rotated in the clockwise direction in the side view of FIG. 3 with respect to the core member 25.

In addition, as shown in FIG. 9, a tension spring as a second deformation urging member 17 is provided between each front leg 30 and the core member 25. Each of the front legs 30 is urged by the spring as the second deformation urging member 17, such that the end of the front leg 30 distant from the core member 25 is moved rearward in the back and forth direction, i.e., rotated in the counterclockwise direction in the side view of FIG. 3 with respect to the core member 25.

Further, a torsion spring as a third deformation urging member 18 (FIG. 11) is disposed around the bending axis line of the arm-member coupling link 72 of the front-leg link mechanism 70. The arm-member coupling link 72 is urged by the spring as the third deformation urging member 18, from the condition in which the arm-member coupling link 72 is horizontally extended toward the condition in which the arm-member coupling link 72 is bent to protrude upward.

According to the first to third deformation urging members 16, 17 and 18, by releasing the first to third condition maintaining mechanisms 91, 95 and 97, the vehicle 20 of the stroller 10 in the used condition can be automatically deformed to the folded condition, and the vehicle body 20 of the stroller can be continuously, stably maintained in the folded condition. In the first place, the folding operation of the stroller 10 is easy, because such an operation can be easily carried out only by swinging the handle member 60 to one direction, and the axis line direction of the handle member 60 is not so moved in the up and down direction and in the back and forth direction during the swinging motion. According to these deformation urging means 16, 17 and 18, and the condition maintaining mechanisms 91, 95 and 97, the folding operation of the stroller 10 can be further facilitated.

Next, there is described a motion of the vehicle body 20 of the stroller 10 when the vehicle body 20 of the stroller 10 in the folded condition is unfolded.

When the vehicle body 20 of the stroller 10 in the folded condition is unfolded, the folding motion of the vehicle body 20 of the stroller 10 is reverse to the aforementioned motion. Specifically, the handle member 60 is swung with respect to the arm members 65 in a direction away from the rear legs 40 (in the counterclockwise direction in the side view of FIG. 3). In accordance with the swinging motion of the handle member 60, the front legs 30, the rear legs 40 and the arm members 65 are swung with respect to the core member 25, so that the vehicle body 20 is unfolded.

At this time, the pair of handle extending parts 61 of the handle member 60 are separated away from each other, and the bending part 62 is unfolded. Once the bending part 62 is unfolded into the used condition, the bending part 62 is restricted from being bent, by the third condition maintaining mechanism 97. The pair of handle extending parts 61 is in positions away from each other by the bending part 62 whose bending motion is restricted.

When the vehicle body 20 of the stroller 10 is unfolded into the used condition, the protrusion 74 of the front-leg link mechanism 70 is guided to the condition maintaining piece 83 extending along the movement path rp of the protrusion 74, so that the protrusion 74 is received in the receiving part (through-hole) 84 formed in the condition maintaining piece 83. Thus, the deformation of the front-leg link mechanism 70 is restricted by the engagement between the protrusion 74 of the front-leg link mechanism 70 and the receiving part (through-hole) 84 of the condition maintaining piece 83, which constitute the second condition maintaining mechanism 95.

In addition, as shown in FIG. 15, the restriction slider 92 constituting the first condition maintaining mechanism 91 is urged by the compression spring 93b in the handle extending part 61. When the vehicle body 20 of the stroller 10 is unfolded into the used condition, the restriction projections 92a of the restriction slider 92 are engaged with (received in) the restriction grooves 68b, from the guide groove 68a of the groove 68 formed in the handle support member 67 of the arm member 65. When the restriction projections 92a are engaged with the restriction grooves 68b, the rotating motion (swinging motion) of the handle extending parts 61 with respect to the handle support members 67 is restricted. In this manner, the swinging motion of the handle member 60 with respect to the arm members 65 is restricted by the engagement between restriction slider 92 and the groove 68, which constitute the first condition maintaining mechanism 91.

As stated above, by swinging the handle member 60, the front legs 30 and the rear legs 40 against the urging forces of the aforementioned first to third urging members 16, 17 and 18, the vehicle body 20 of the stroller 10 can be deformed into the unfolded used condition, and can be automatically fixed on the used condition by the first to third condition maintaining mechanisms 91, 95 and 97. Thus, similarly to the folding operation of the stroller 10, the unfolding operation of the stroller 10 can be significantly easily carried out.

Next, there are further described in detail the rear wheel carrier 50 held on the lower end of each rear leg 40 through the carrier support member 43, and the rear wheel unit 45 held on the rear wheel carrier 50.

As shown in FIGS. 1 to 7, for example, the rear wheel carriers 50 are supported on the ends of the respective rear legs 40, which are distant from the core member 25, through the carrier support members 43, respectively. On the other hand, each of the rear wheel units 45 includes an axle 46 detachably attached to the corresponding rear wheel carrier 50, the rear wheel 47 rotatably supported on the axle 46, and a brake ring 48 rotatable synchronically with the rear wheel 47 with respect to the axle 46. The rear wheel unit 45 is detachably held on the rear wheel carrier 50.

The brake ring 48 has a number of restriction grooves 48c formed in a surface thereof which faces the rear wheel carrier 50 when the brake ring 48 is supported on the rear wheel carrier 50. The restriction grooves 48c are arranged in a circumferential direction of a virtual circle about the axle 46. The respective grooves 48c extend radially about the axle 46, and open radially inward. When a restriction engagement member 55 movably protruding from the rear wheel carrier 50 moves into the restriction groove 48c, the brake ring 48 is restricted from being rotated about the axle 46. When the rotation of the brake ring 48 is restricted, the rotation of the rear wheel 47 with respect to the axle 46 is also restricted. The restriction engagement member 55 will be described in detail, together with the other constituent elements of the rear wheel carrier 50.

Figure 19:
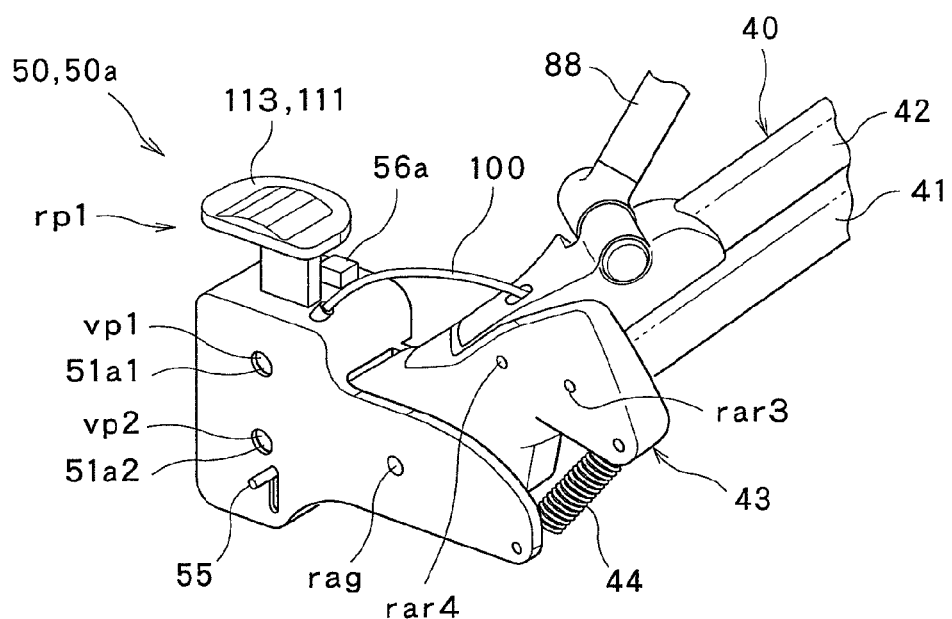
FIG. 19 is a perspective view from an outside in the width direction the rear leg and the rear wheel carrier attached to the lower end of the rear leg, with the rear wheel unit being detached.

As shown in FIG. 19, the rear wheel carrier 50 is connected to the carrier support member 43, such that the rear wheel carrier 50 can be rotated about a horizontally extending rotating axis line rag, at a predetermined angle range with respect to the carrier support member 43. A suspension 44 is disposed between the rear wheel carrier 50 and the carrier support member 43. By the rotating motion of the rear wheel carrier 50, which is urged by the suspension 44, with respect to the carrier support member 43, it is possible to restrain vibrations and distortion of the vehicle body 20, which are otherwise caused by irregularities of the ground surface (traveling surface) of the stroller 10 during traveling.

Figure 20:
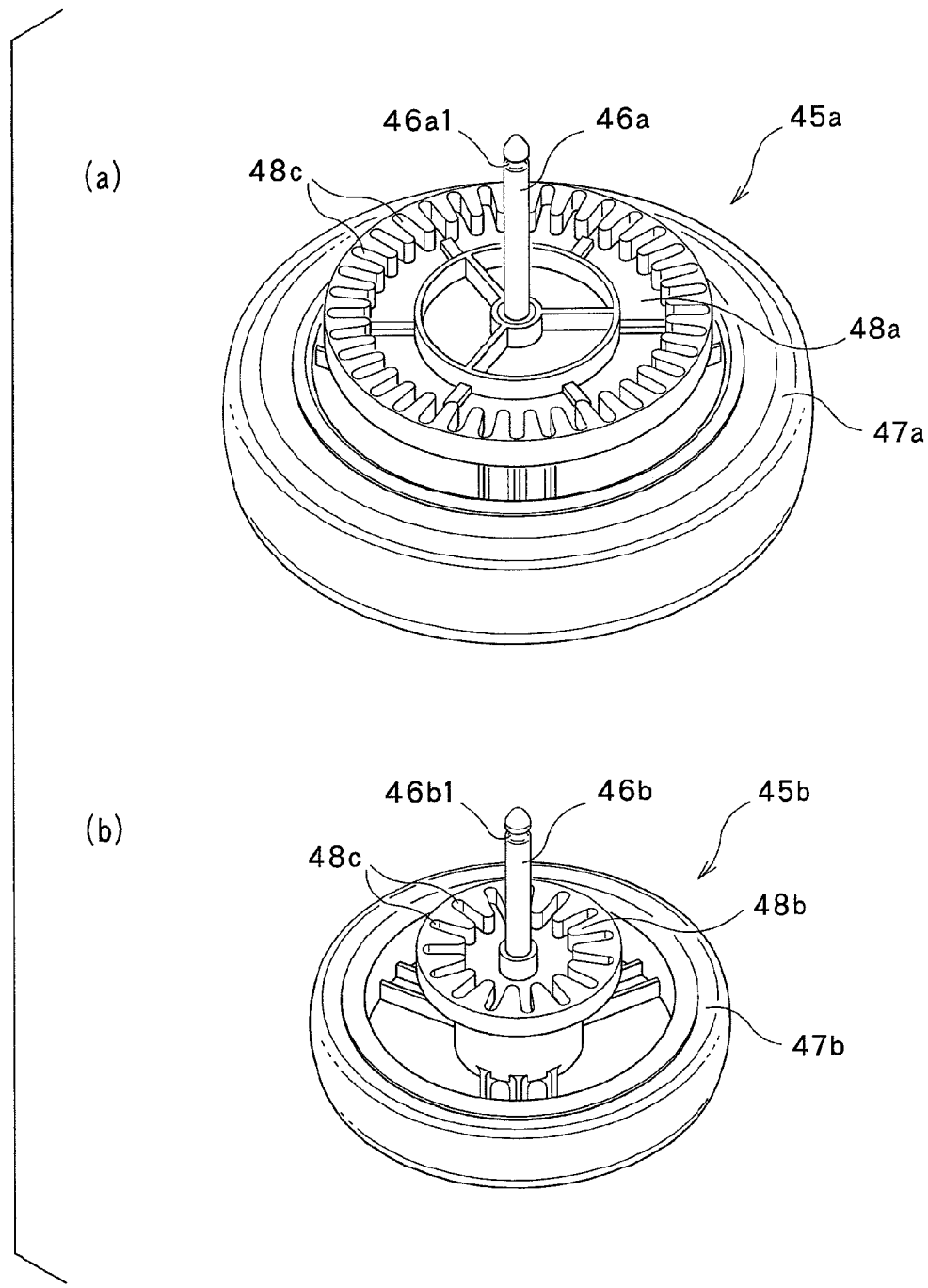
FIG. 20 includes perspective views showing two types of rear wheel units having rear wheels different from each other.
Figure 22:
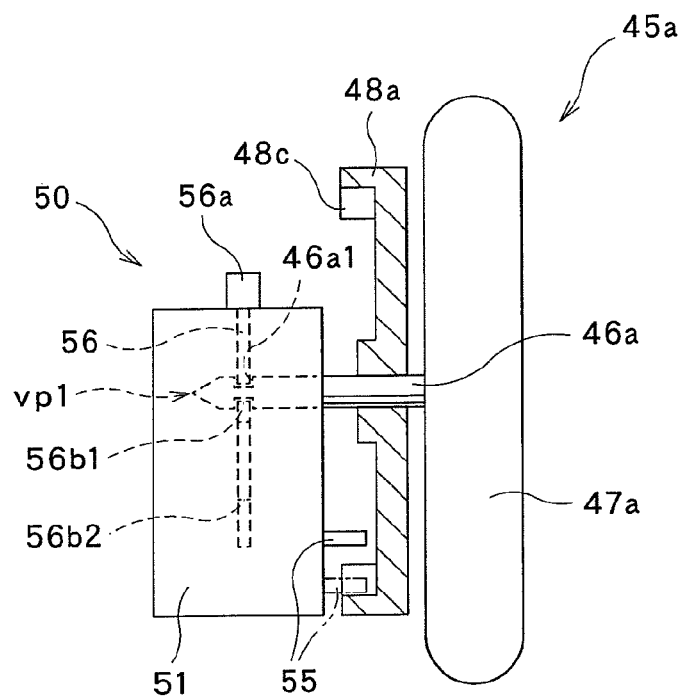
FIG. 22 is a schematic view for explaining the holding mechanism of the rear wheel unit, the view showing the rear wheel carrier holding the first rear wheel unit.
Figure 23:
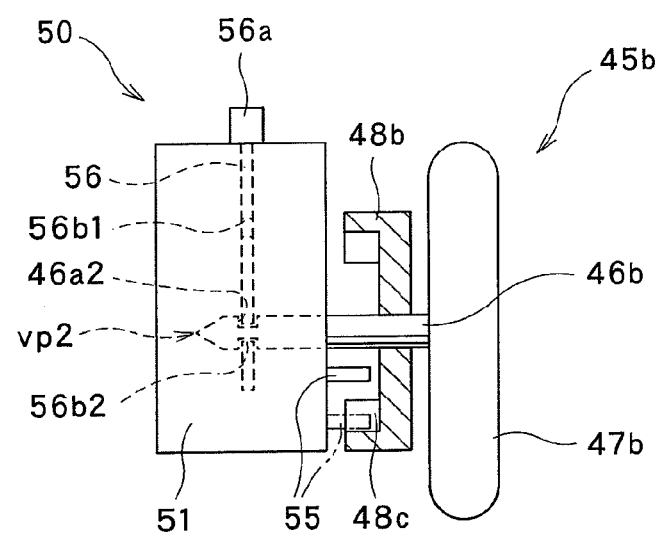
FIG. 23 is a schematic view for explaining the holding mechanism of the rear wheel unit, the view showing the rear wheel carrier holding the second rear wheel unit.

As shown in FIGS. 20, 22 and 23, the stroller 10 in this embodiment includes a pair of rear wheel units 45a and a pair of second rear wheel units 45b, which are alternatively used. The pair of rear wheel units 45a or the pair of rear wheel units 45b are selected, and the selected pair of rear wheel units are held on the pair of rear wheel carriers 50, respectively. As shown in FIG. 20, a diameter of the first rear wheel 47a of the first rear wheel unit 45a is larger than a diameter of the rear wheel 47b of the second rear wheel unit 45b. The rear wheel 47a of the first rear wheel unit 45a has a rubber hollow tire filled with air, and the rear wheel 47b of the second rear wheel unit 45b has a rubber solid tire with no air. In addition, a diameter of the brake ring 48a of the first rear wheel unit 45a is larger than a diameter of the brake ring 48b of the second rear wheel unit 45b.

When the one stroller 10 has the two types of rear wheel units 45a and 45b which can be replaced with each other, it is possible to select the rear wheel unit 45 including the suitable rear wheel 47 depending on a state of a road surface (ground surface, traveling surface) on which the stroller 10 travels. As one example, when the stroller 10 travels on a rough road surface, the first rear wheel units 45a are preferably selected. When the first rear wheel units 45a are used, vibrations and distortion of the stroller 10, which is caused by the irregularities of the road surface, can be absorbed by the rear wheels 47a composed of the rubber hollow tires of a larger diameter. Thus, the stability of the stroller 10 can be improved, whereby it is possible that stroller 10 placing thereon a baby can travel more safely and more stably. As another example, when the stroller 10 travels in a crowded place, the second rear wheel units 45b are preferably selected. When the second rear wheel units 45b are used, the rear wheels 47b composed of the rubber sold tires of a smaller diameter makes it possible that the stroller 10 can have a tight turning circle, whereby the maneuverability thereof can be enhanced.

As shown in FIGS. 22 and 23, in the used condition, the rear wheel carrier 50 in this embodiment is configured to support the axle 46a of the first rear wheel unit 45a and the axle 46b of the second rear wheel unit 45b, at different vertical positions (positions in the up and down direction) vp1 and vp2 (see FIG. 19). As shown in FIGS. 22 and 23, the axle 46a of the first rear wheel unit 45a supporting the rear wheel 47a including the tire of a larger diameter is supported on the position vp1 which is vertically upper than the axle 46b of the second rear wheel unit 45b supporting the rear wheel 47b including the tire of a smaller diameter. Thus, even when the first rear wheel units 45a and the second rear wheel units 45b respectively having the rear wheels 47a and 47b of different diameters are replaced with each other, the height of the vehicle body 20 of the stroller 10 and the height of a position on which the baby is placed are not varied. Thus, it is possible to prevent that a gravity position of the stroller 10 is varied and that a field of view of the baby placed on the stroller 10 is varied, which are otherwise occur upon the replacement of the rear wheel units 45 and 45b. Therefore, impairment of maneuverability, impairment of traveling property and impairment of sitting comfortableness, which may be caused by variation of the gravity position, can be prevented.

In particular, in this embodiment, the axle 46a of the first rear wheel unit 45a is held on the rear wheel carrier 50 at a position vertically upper than the axle 46b of the second rear wheel unit 45b, by a length substantially equal to a difference between a radius of the rear wheel 47a of the first rear wheel unit 45a and a radius of the rear wheel 47b of the second rear wheel unit 45b. Thus, in either case in which the rear wheel carrier 50 holds the rear wheel units 45a or the rear wheel units 45b, the rear wheel carrier 50 holding the rear wheel units 45a or 45b can be located on the same vertical position from the ground surface. Thus, there is no possibility that a gravity position of the stroller 10 is varied and that a field of view of the baby placed on the stroller 10 is varied, which are otherwise occur upon the replacement of the rear wheel units 45 and 45b.

In this embodiment, a radius of the brake ring 48a of the first rear wheel unit 45a is larger than a radius of the brake ring 48b of the second rear wheel unit 45b, by a length substantially equal to a difference between the radius of the rear wheel 47a of the first rear wheel unit 45a and the radius of the rear wheel 47b of the second rear wheel unit 45b. In this case, as shown in FIGS. 22 and 23, the single restriction engagement member 55 can be engaged with both of the brake rings 48a and 48b of the rear wheel units 45a and 45b. Namely, the structure of the rear wheel carrier 50 can be simplified, whereby reduction in weight and reduction in size can be achieved.

There is described a structure for holding the rear wheel unit 45 (45a, 45b) on the rear wheel carrier 50.

Figure 21:
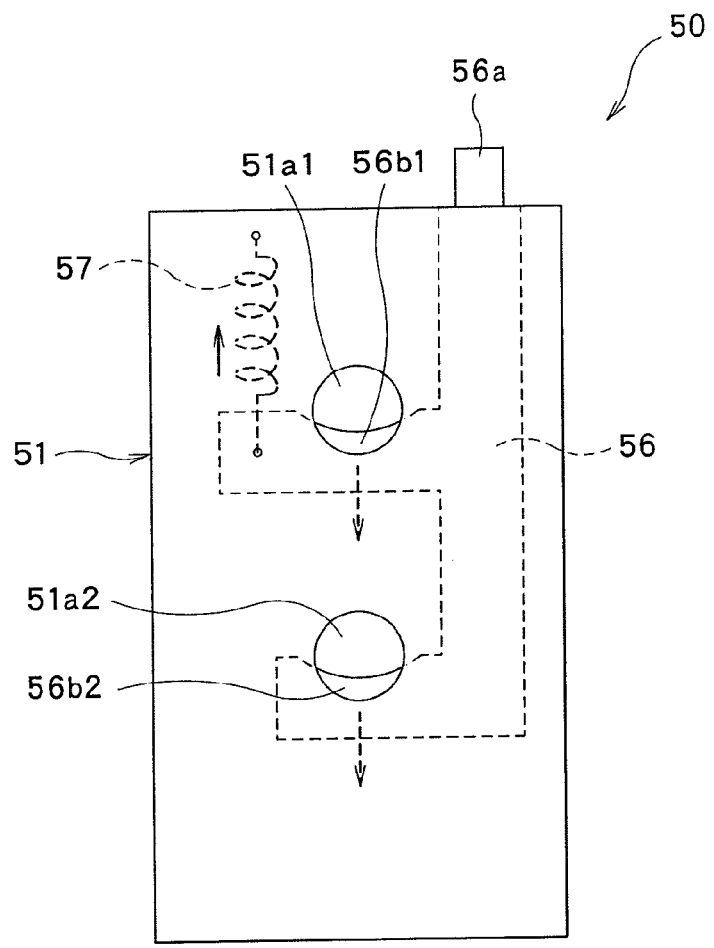
FIG. 21 is a schematic view for explaining a holding mechanism of the rear wheel unit, the view showing the rear wheel carrier.

As shown in FIG. 21, each of the pair of rear wheel carriers 50 includes a body 51 as a casing, a holding member (holding plate in the illustrated example) 56 disposed in the body 51, and an urging spring 57 that draws the holding plate 56 vertically upward from below. A part of the holding plate 56 is exposed outside from the body 51 so as to serve as an operation button 56a (see, e.g., FIG. 18). By pressing the operation button 56a from outside the body 51, the holding plate 56 can be pushed vertically downward in the body 51, against the urging force of the urging spring 57.

As shown in FIGS. 19 and 21, the body 51 has a first hole 51a1 for receiving the axle 46a of the first rear wheel unit 45a, and a second hole 51a2 for receiving the axle 46b of the second rear wheel unit 45b. The first hole 51a1 and the second hole 51a2 are vertically spaced apart from each other. The holding plate 56 has a first contact part 56b1 and a second contact part 56b2. The first contact part 56b1 is configured to be located on a position facing the first hole 51a1 and to partially block the first hole 51a1 from below, when the holding plate 56a is drawn upward by the urging spring 57. The second contact part 56b2 is configured to be located on a position facing the second hole 51a2 and to partially block the second hole 51a2 from below, when the holding plate 56a is drawn upward by the urging spring 57. On the other hand, as shown in FIGS. 20, 22 and 23, a distal end of the axle 46 (46a, 46b) of the rear wheel unit 45 (45a, 45b) is formed to be tapered. In addition, as shown in FIGS. 20, 22 and 23, circumferential grooves 46a1 and 46b1 are formed in parts near to the distal ends of the axles 46a and 46b, respectively.

In such a structure, simply by inserting the distal end of the axle 46 (46a, 46b) of the rear wheel unit 45 (45a, 45b) into the first hole 51a1 of the rear wheel carrier 50 or the second hole 51a2 thereof, the rear wheel unit 45 (45a, 45b) can be held on the rear wheel carrier 50. Specifically, the contact parts 56b1 and 56b2 of the holding plate 56 are pressed vertically downward by the tapered distal end of the axle 46 (46a, 46b). Thus, the axle 46 (46a, 46b) passes through the holding plate 56 into the body 51. At this time, the contact parts 56b1 and 56b2 of the holding plate 56 are brought into contact with the axle 46 (46a, 46b) from below, by the urging force from the urging spring 57. Finally, as shown in FIGS. 22 and 23, the contact parts 56b1 and 56b2 of the holding plate 56 are engaged with the circumferential groove 46a1 or 46b1 of the axle 46 (46a, 46b), so that the axial movement of the axle 46 (46a, 46b) is restricted. By pressing the operation button 56a so as to push down the holding plate 56 in the body 51, the rear wheel unit 45 (45a, 45b) held on the rear wheel carrier 50 can be detached from the rear wheel carrier 50.

Figure 24:
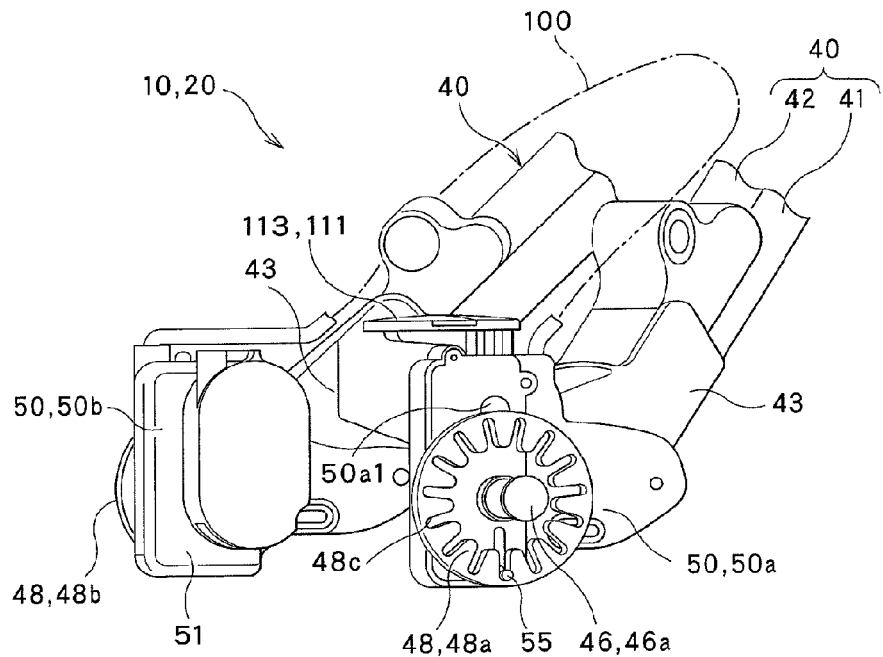
FIG. 24 is a view showing, from the side of the one rear wheel carrier, a lower area of the pair of rear legs, with the rear wheel unit being detached therefrom.
Figure 25:
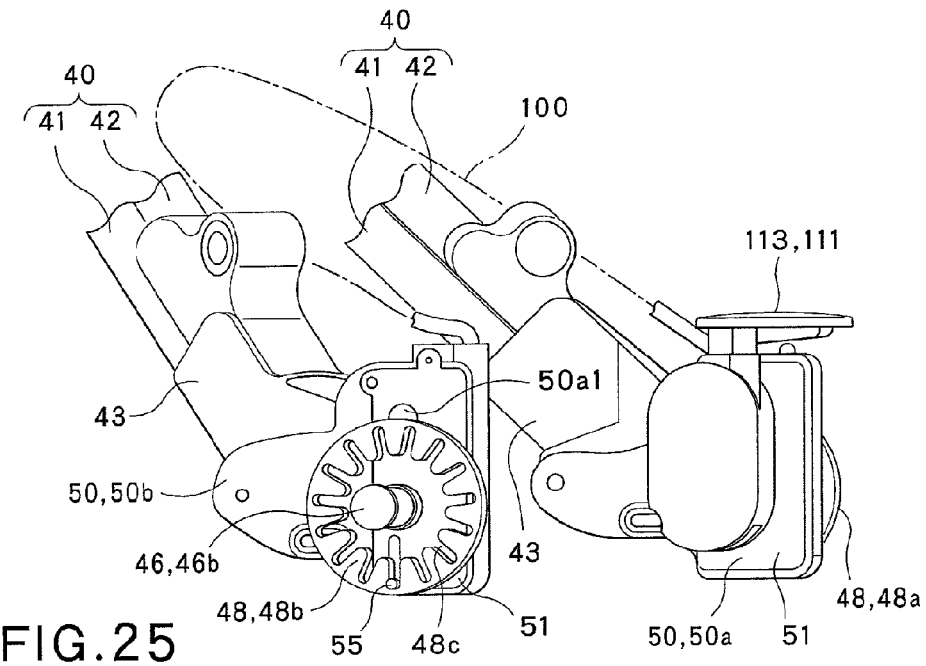
FIG. 25 is a view corresponding to FIG. 24, showing the lower area of the pair of rear legs, with the rear wheel unit being detached therefrom, from the side of the other rear wheel carrier.

Next, there are described a structure for restricting the rotation of the rear wheel 47 of the rear wheel unit 45, and an operation thereof. As can be understood from FIGS. 24 and 25 showing the lower end of each of the pair of rear legs 40 in which illustration of the rear wheel 47 is omitted, each of the pair of rear wheel carriers 50 has the restriction engagement member 55, and the rear wheel unit 45 supported on each rear wheel carrier 50 has the brake ring 48 to be engaged with the restriction engagement member 55. Thus, the pair of rear wheels 47 are independently restricted from being rotated.

As shown in FIGS. 24 and 25, a transmission mechanism 100 is disposed between the one rear wheel carrier (first rear wheel carrier) 50a and the other rear wheel carrier (second rear wheel carrier) 50b. The movement of the restriction engagement member 55 of the one rear wheel carrier 50a can be transmitted by the transmission mechanism 100 to the other rear wheel carrier 50b, so that the restriction engagement member 55 of the other rear wheel carrier 50b can be moved in conjunction with the movement of the restriction engagement member 55 of the one rear wheel carrier 50a. Thus, in this embodiment, only by operating the one rear wheel carrier 50a, the rotation of the rear wheels 47 of the rear wheel units 45 held on both of the rear wheel carriers 50a and 50b can be restricted, without operating the other rear wheel carrier 50b.

Figure 26:
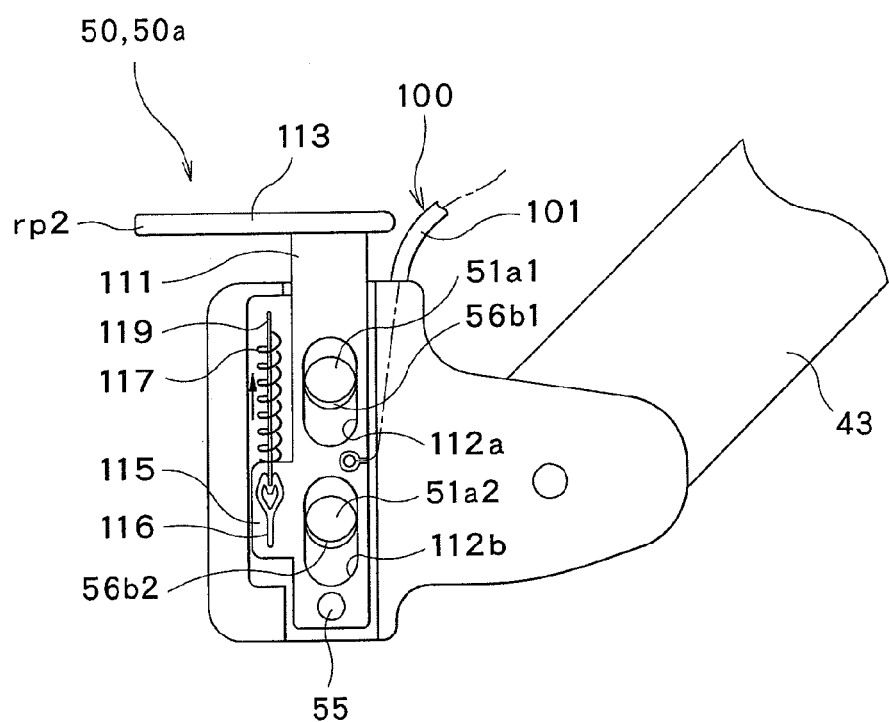
FIG. 26 is a view showing a longitudinal section of the one rear wheel carrier shown in FIG. 24.

At first, a structure and an operation of the one rear wheel carrier 50a are described. As shown in FIG. 26, the rear wheel carrier 50a includes the aforementioned body (casing) 51 for holding the axle 46 of the wheel unit 45, a sliding member 111 capable of being slid in one direction with respect to the body 51, and an urging member 117 disposed in the body 51 for urging the sliding member 111 from one side to the other side that is opposite to the one side along the one direction.

In this embodiment, the one direction is generally the up and down direction (vertical direction). The one side in the one direction is a lower side in the up and down direction, and the other side in the one direction is an upper side in the up and down direction.

The restriction engagement member 55, which can move into the restriction groove 48c of the brake ring 48 of the wheel unit 45, is attached to the sliding member 111. When no external force is applied, the sliding member 111 is configured to be held on one of a first holding position rp1 and a second holding position rp2 which is located nearer to the one side along the one direction than the first holding position rp1. When the sliding member 111 is held on the second holding position rp2 (which is shown by the two-dot chain lines in FIGS. 22 and 23), the restriction engagement member 55 is engaged with the restriction groove 48c of the brake ring 48 of the wheel unit 45 so as to restrict the rotation of the rear wheel 47 with respect to the axle 46. On the other hand, when the sliding member 111 is held on the first position rp1 (which is shown by the solid line in FIGS. 22 and 23), the engagement between the restriction engagement member 55 and the wheel unit 45 is released, i.e., the restriction engagement member 55 is disengaged from (moved out of) the restriction engagement groove 48c of the brake ring 48 of the wheel unit 45, which allows the rotation of the rear wheel 47 with respect to the axle 46.

As shown in FIG. 26, two elongated holes 112a and 112b are formed in the sliding member 111. The elongated holes 112a and 112b are formed at positions facing the holes 51a1 and 51a2 into which the aforementioned axle 46 (46a, 46b) is inserted.

The siding member 111 is further provided with an operation part 113 by which an external force for pressing the sliding member 111 from the other side (the upper side in the up and down direction) to the one side (the lower side in the up and down direction) can be applied. The operation part 113 is formed of a part of the sliding member 111, and is integrally formed with the sliding member 111. Thus, the operation part 113 is moved in the one direction in conjunction with the restriction engagement member 55. The operation part 113 is disposed outside the body 51, and is located adjacent to the rear wheel 47 in a lower end region of the rear leg 40. A user can directly apply an external force by contacting the operation part 113.

The sliding member 111 is configured such that a position on which the sliding member 111 is held is alternately changed between the first holding position rp1 and the second holding position rp2, for each time when the sliding member 111 is once pressed from the other side to the one side along the one direction, more strictly, from the other side to the one side over the second holding position, and is then returned to the other side from the one side by the urging force of the urging member 117. In particular, in this embodiment, the sliding member 111 is configured such that the position on which the sliding member 111 is held after the sliding member 111 has been returned from the one side to the other side by the urging force of the urging member 117, is alternately changed between the first holding position rp1 and the second holding position rp2, for each time when the sliding member 111 is slid to a position nearest to the one side within the slidable range along the one direction. The concrete structure is described below.

One of the body 51 and the sliding member 111 includes a surface 115 which is substantially in parallel with the one direction and has a linearly extending engagement groove 116. On the other hand, supported on the other of the body 51 and the sliding member 111 is an insertion member 119 whose distal end is located in the engagement groove 116. The displacement of the insertion member 119 to the one direction is restricted. In the example shown in FIG. 26, the other end of the insertion member 119 is fixed on the body 51, and the insertion member 119 extends downward to the one side in the one direction. The insertion member 119 is formed of a metal wire (metal rod). On the other hand, as shown in FIG. 26, the sliding member 111 has the surface 115 in which the linearly extending engagement groove 116 is formed.

Figure 27:
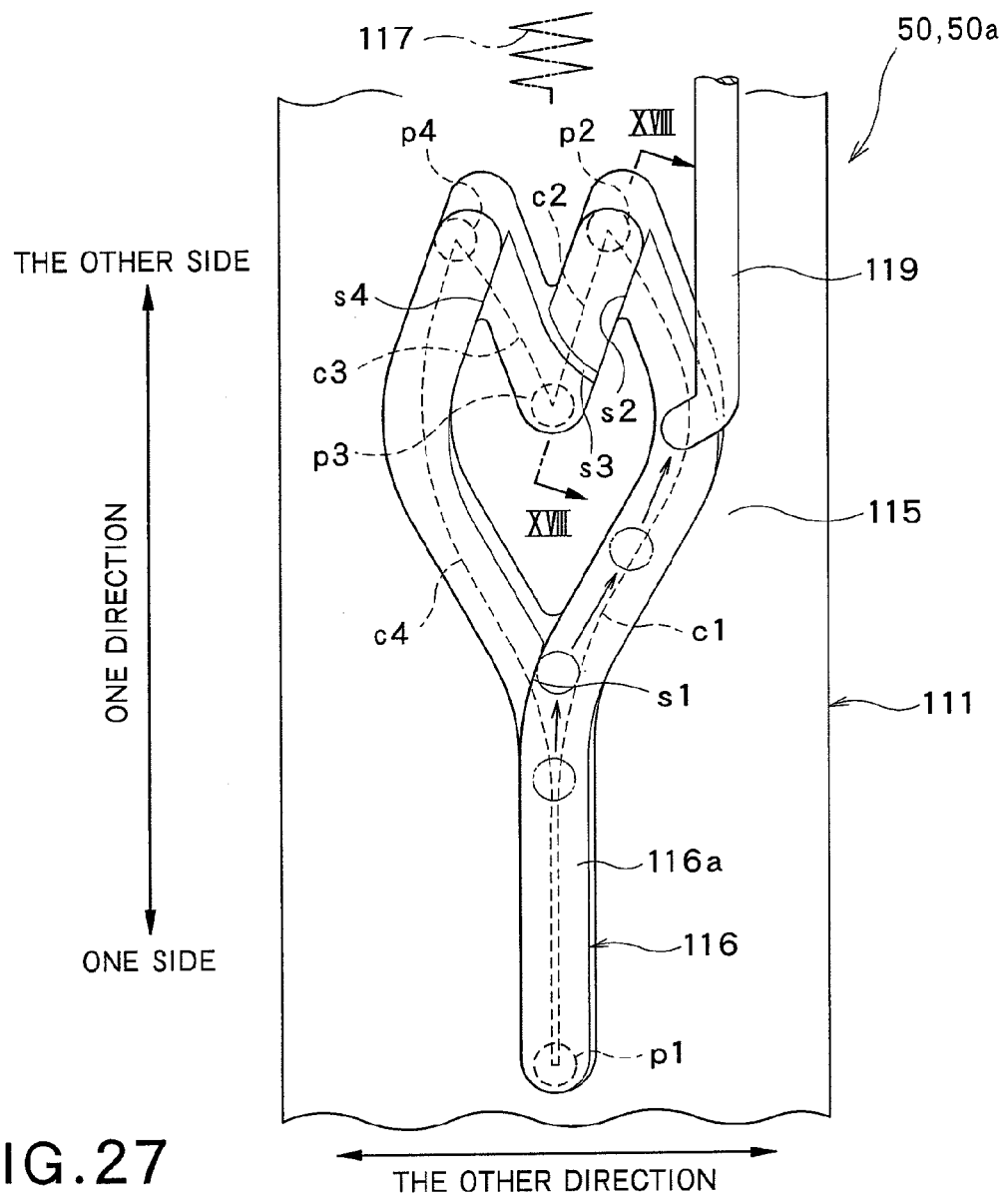
FIG. 27 is a view for explaining an operation of the rear wheel carrier, and for explaining an engagement condition between a body of the rear wheel carrier and a sliding member.

The insertion member 119 extends from the other side to the one side along the one direction. However, as shown in FIG. 27, the distal end on the one side of the insertion member 119 is curved at 90°, and is extended along a normal line of the surface 115 of the sliding member 111 and along a depth direction of the engagement groove 116. The distal end of the insertion member 119 extends into the engagement groove 116. The distal end of the insertion member 119 and a bottom surface 116a of the engagement groove 116a are pressed toward each other, so that the distal end of the insertion member 119 is in contact with the bottom surface 116a of the engagement groove 116. The insertion member 119 is restricted from being moved to the one direction. However, when the elongated insertion member 119 is warped, the distal end of the insertion member 119 can be moved in a direction perpendicular to the one direction. Under this structure, due to the engagement between the insertion member 119 and the engagement groove 116, the free movement of the sliding member 111 having the engagement groove 116 is restricted with respect to the body 51 supporting the insertion member 119.

As shown in FIG. 27, the engagement groove 116 includes a path composed of a first groove path c1 extending from a first turning position p1 to a second turning position p2 that is located on a position nearer to the other side than the first turning position p1 in the one direction, a second groove path c2 extending from the second turning position p2 to a third turning position p3 that is located on a position nearer to the one side than the second turning position p2 in the one direction, a third groove path c3 extending from the third turning position p3 to a fourth turning position p4 that is located on a position nearer to the other side than the third turning position p3 in the one direction, and a fourth groove path c4 extending from the fourth turning position p4 to the first turning position p1 that is located nearer to the one side than the fourth turning position in the one direction. The engagement groove 116 and the insertion member 119 are configured such that the insertion member 119 arrives at the first to fourth turning positions p1 to p4 in this order, so as to circulate in the engagement groove 116.

As shown in FIG. 27, the first turning position p1 and the third turning position p3 are located between the second turning position p2 and the fourth turning position p4, in the surface 115 having the engagement groove 116, in the other direction perpendicular to the one direction. Thus, the engagement groove 116 is circumferentially formed, without any turning point in the one direction other than the first to fourth turning positions p1 to p4, and without any intersection of paths.

Figure 28:
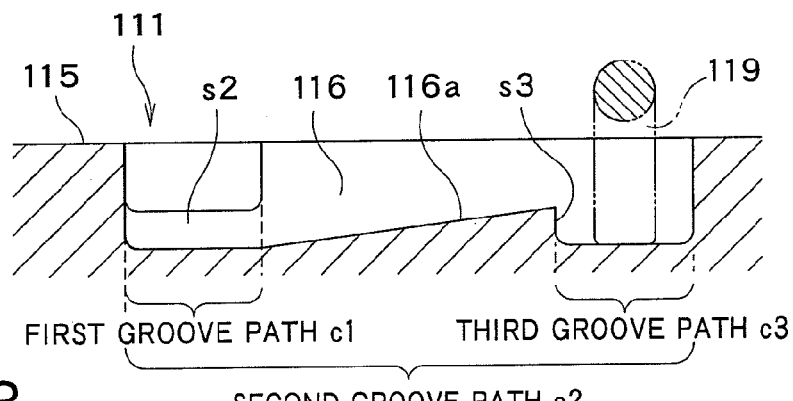
FIG. 28 is a sectional view taken along the line XXVI-XXVI of FIG. 27.

In this embodiment, in an area of the engagement groove 116 where the first groove path c1 and the second groove path c2 are merged (connected), a depth of the engagement groove 116 of the second groove path c2 is greater (deeper) than a depth of the engagement groove 116 of the first groove path c1. As a result, as shown in FIGS. 27 and 28, a step s2 along the second groove path c2 is formed. The insertion member 119, which has arrived at the second turning position p2 by the step s2, is prevented by the step s2 from moving into the first groove path c2 but is guided to the third turning position p3 along the second groove path c2, when the insertion member 119 is then relatively moved toward the one side in the one direction with respect to the engagement groove 116.

In an area of the engagement groove 116 where the second groove path c2 and the third groove path c3 are merged (connected), a depth of the third groove path c3 is greater (deeper) than the depth of the second groove path c2. As a result, as shown in FIGS. 27 and 28, a step s3 along the third groove path c3 is formed. The insertion member 119 having arrived at the third turning position p3 is then guided by the step s3 to the fourth turning position p4 along the third groove path c3.

In an area of the engagement groove 116 where the third groove path c3 and the fourth groove path c4 are merged (connected), a depth of the engagement groove 116 of the fourth groove path c4 is greater (deeper) than the depth of the engagement groove 116 of the third groove path c3. As a result, as shown in FIG. 27, a step s4 along the fourth groove path c4 is formed. The insertion member 119 having arrived at the fourth turning position p4 is then guided by the step s4 to the first turning position p1 along the fourth groove path c4.

In an area of the engagement groove 116 where the fourth groove path c4 and the first groove path c1 are merged (connected), the depth of the engagement groove 116 of the first groove path c1 is greater (deeper) than the depth of the engagement groove 116 of the fourth groove path c4. As a result, as shown in FIG. 27, a step s1 along the first groove path c1 is formed. As shown by the two-dot chain lines in FIG. 27, the insertion member 119 having arrived at the first turning position p1 is then guided by the step s1 to the second turning position p2 along the first groove path c1.

In this manner, by repeating the relative movement of the engagement groove 116 and the insertion member 119 to the one side in the one direction and the relative movement of the engagement groove 116 and the insertion member 119 to the other side in the one direction, the insertion member 119 arrives at the first to fourth turning positions p1 to p4 in this order so as to circulate in the engagement groove 116.

As described above, in this embodiment, the engagement groove 116 is formed in the one surface 115 of the sliding member 111, and the insertion member 119 is supported on the body 51 at the other side end in the one direction thereof. The sliding member 111 is urged by the urging member 117 from the one side in the one direction to the other side. As a result, the engagement groove 116 is urged by the urging member 117, such that the engagement groove 116 is relatively moved with respect to the insertion member 119 from the one side in the one direction (vertically lower side) to the other side in the one direction (vertically upper side). In FIG. 27, the groove 116 is relatively moved with respect to the insertion member 119 from the lower side to the upper side in the plane of FIG. 27.

Thus, when no external force is applied to the sliding member 111, the insertion member 119 is located on the first turning position p1 or the third turning position p3, which forms the turning point protruding toward the one side in the one direction. In this embodiment, when the insertion member 119 is located on the first turning position p1, the sliding member 111 is located on the vertically upper first holding position rp1 (the position shown in FIG. 19). On the other hand, when the insertion member 119 is located on the third turning position p3 of the engagement groove 116, the sliding member 111 is located on the vertically lower second holding position rp2 (the position shown in FIG. 24).

As shown by the solid lines in FIGS. 22 and 23, when the sliding member 111 is located on the first holding position, the restriction engagement member 55 attached to the sliding member 111 is disengaged from (moved out of) the restriction groove 48c of the brake ring 48 of the rear wheel unit 45, so that the rotation of the rear wheel 47 in synchronization with the brake ring 48 is not restricted. On the other hand, as shown by the two-dot chain lines in FIGS. 22 and 23, when the sliding member 111 is located on the second holding position, the restriction engagement member 55 attached to the sliding member 111 is engaged with the restriction grove 48c of the brake ring 48 of the rear wheel unit 45, so that the rotation of the rear wheel 47 in synchronization with the brake ring 48 is restricted.

In the case where the insertion member 119 is located on the first turning position p1 of the engagement groove 116, when the sliding member 111 is pressed from the other side in the one direction toward the one side, the sliding member 111 having the engagement groove 116 is moved to the one side in the one direction, with respect to the body 51 holding the insertion member 119. To put it reversely, the insertion member 119 is relatively moved to the other side in the one direction, with respect to the engagement groove 116. At this time, the insertion member 119 does not move into the fourth groove path c4 by means of the step s4, but advances along the first groove path c1. As a result, the sliding member 111 can be moved to the one side in the one direction, by the external force applied from outside, until the insertion member 119 arrives at the second turning position p2 of the engagement groove 116.

Upon the arrival of the insertion member 119 at the second turning position p2 of the engagement groove 116, when the pressing force applied from outside to the sliding member 111 is released, the sliding member 111 having the engagement groove 116 is moved by the urging force of the urging member 117 to the other side in the one direction, with respect to body 51 holding the insertion member 119. As described above, at this time, the insertion member 111 does not move into the first groove path c1 by means of the step s1, but advances along the second groove path c2. As a result, the sliding member 111 can be moved to the other side in the one direction by the urging force from the urging member 117, until the insertion member 119 arrives at the third turning position p3 of the engagement groove 116.

When the insertion member 119 cannot be moved from the first turning position p1 to the second turning position p2 by some reason or other, for example, by the insertion member 119 which is caught by something in the engagement groove 116, the insertion member 119 is again returned to the first turning position p1 by the urging force from the urging member 117 so that the sliding member 111 is again held on the first holding position. In this case, since the operator cannot feel that the insertion member 119 falls down over the second step s2 during the operation and can look at the position of the operation part 113 extending from the body 51, the operator can understand that the due operation was not performed.

Similarly, in the case where the insertion member 119 is located on the third turning position p3 of the engagement groove 116, when the sliding member 111 is pressed from the other side in the one direction toward the one side, the sliding member 111 having the engagement groove 116 is moved to the one side in the one direction with respect to the body 51 holding the insertion member 119. To put it reversely, the insertion member 119 is relatively moved to the other side in the one direction, with respect to the engagement groove 116. At this time, the insertion member 119 does not move into the second groove path c2 by means of the step s2, but advances along the third groove path c3. As a result, the sliding member 111 can be moved by the pressing force applied from outside to the one side in the one direction, until the insertion member 119 arrives at the fourth turning position p4 of the engagement groove 116.

Upon the arrival of the insertion member 119 at the fourth turning position p4 of the engagement groove 116, when the pressing force applied from outside to the sliding member 111 is released, the sliding member 111 having the engagement groove 116 is moved by the urging force of the urging member 117 to the other side in the one direction, with respect to the body 51 holding the insertion member 119. As described above, the insertion member 119 does not move into the third groove path c3 by means of the step s3, but advances along the fourth groove path p4. As a result, the sliding member 111 can be moved to the other side in the one direction by the urging force from the urging member 117, until the insertion member 119 arrives at the first turning position p1 of the engagement groove 116.

When the insertion member 119 cannot be moved from the third turning position p3 to the fourth turning position p4 by some reason or other, the insertion member 119 is again returned to the third turning position p3 by the urging force from the urging member 117 so that the sliding member 111 is again returned to the second holding position. In this case, since the operator cannot feel that the insertion member 119 falls down over the fourth step s4 during the operation and can look at the position of the operation part 113 extending from the body 51, the operator can understand that the due operation was not performed.

In the above manner, the sliding member 111 is configured such that the position on which the sliding member 111 is held after the sliding member 111 has been returned from the one side to the other side by the urging force of the urging member 117, is alternately changed between the first holding position rp1 and the second holding position rp2, for each time when the sliding member is pressed from the other side to the one side along the one direction, more strictly, from the other side to the one side over the second holding position. Thus, the switching operation between the condition in which the rotation of the rear wheels is restricted and the condition in which the rotation of the rear wheels is allowed can be realized, only by applying an external force to the sliding member 111 to one orientation along the one direction.

Figure 18:
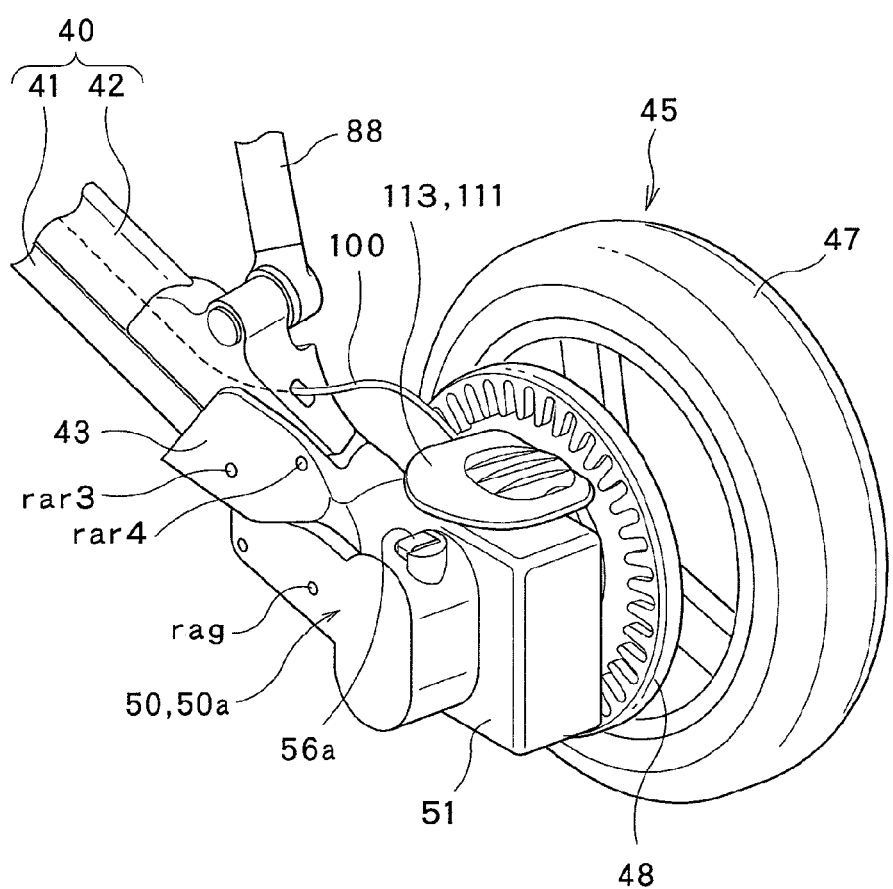
FIG. 18 is a perspective view from an inside in a width direction a rear leg and a rear wheel carrier attached to a lower end of the rear leg, with a rear wheel unit being attached.

In particular, in this embodiment, as well shown in FIG. 18, an external force can be applied to the sliding member 111 through the operation part 113 located adjacently to the rear wheel 47. According to such a structure, only by pressing down the operation part 113 by foot, the operator can switch the rear wheels 47 between the condition in which the rear wheels 47 can be rotated and the condition in which the rear wheels 47 cannot be rotated. Thus, it is possible to switch the rear wheels 47 between the condition in which the rear wheels 47 can be rotated and the condition in which the rear wheels 47 cannot be rotated, while preventing that the vehicle body 20 of the stroller 10 is moved in an unintended direction by putting the hand on the handle member 60. Such an operation can be carried out with a natural pose, without looking away from the baby on the stroller 10.

Figure 30:
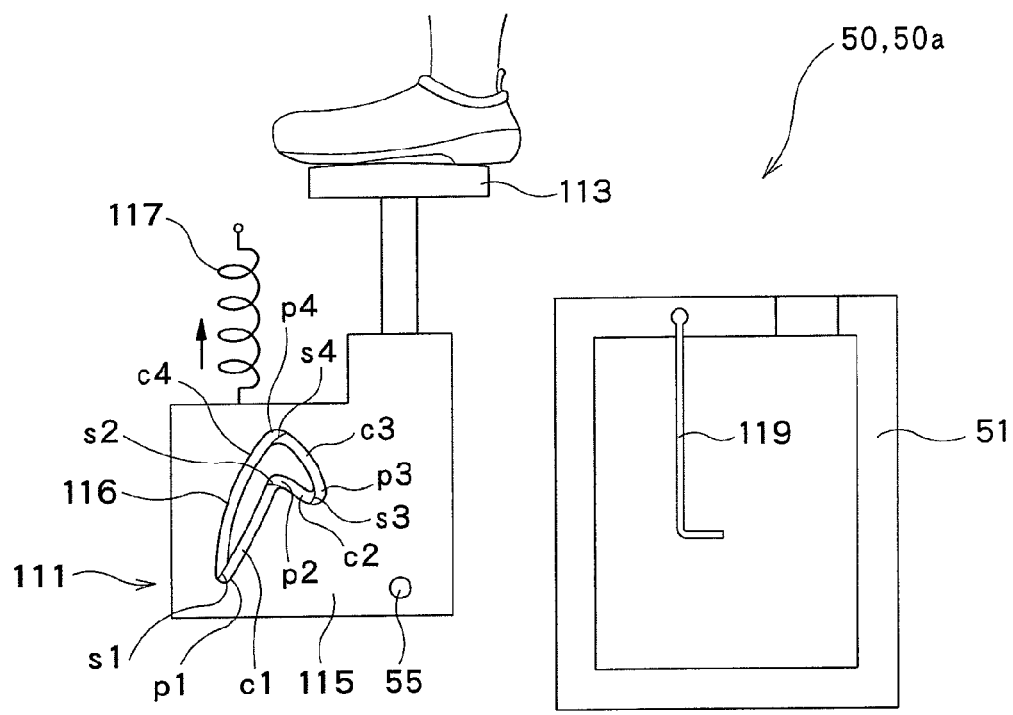
FIG. 30 is a schematic view for explaining a first modification of the rear wheel carrier, the view showing a body of the rear wheel carrier and an insertion member thereof.
Figure 31:
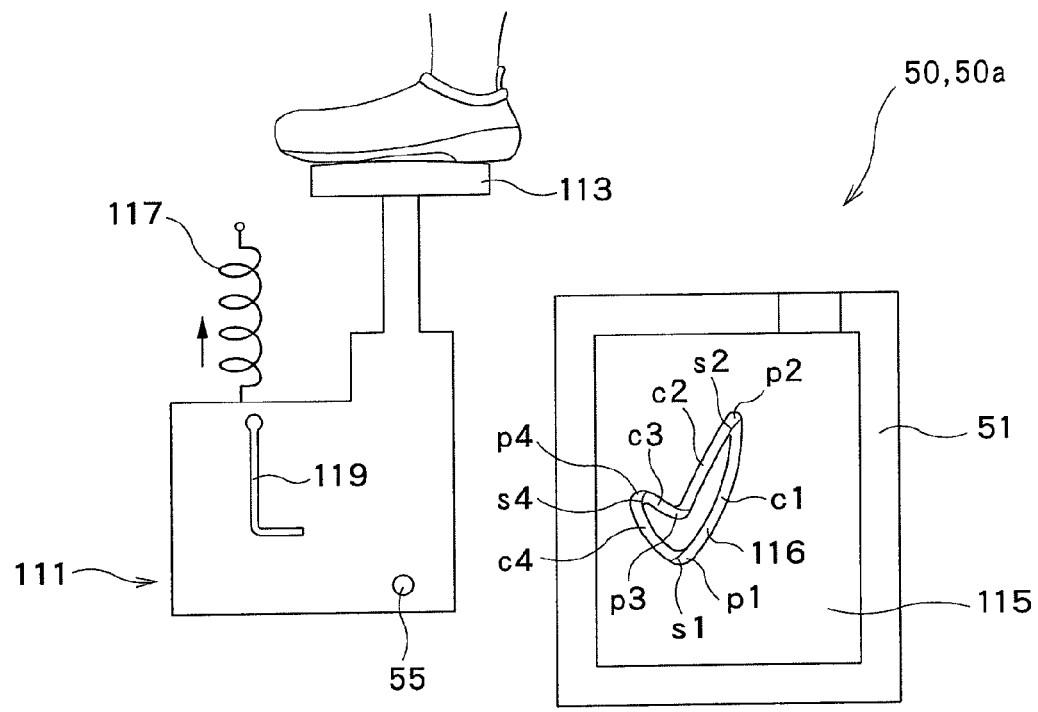
FIG. 31 is a schematic view for explaining a second modification of the rear wheel carrier, the view showing the body of the rear wheel carrier and the insertion member thereof.
Figure 32:
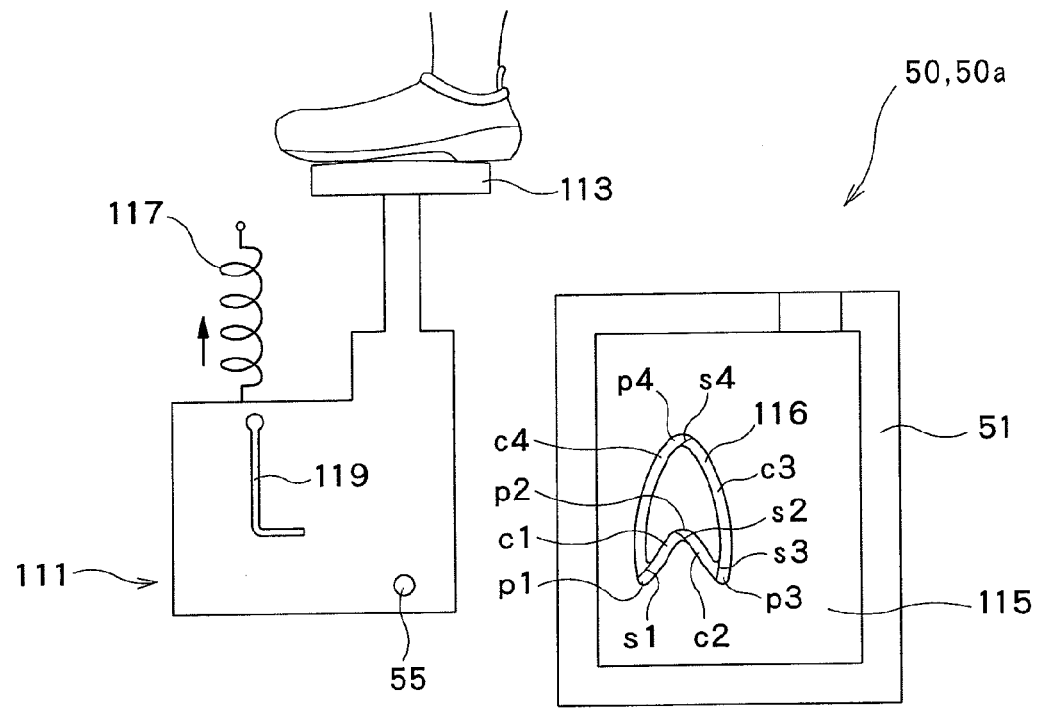
FIG. 32 is a schematic view for explaining a third modification of the rear wheel carrier, the view showing the body of the drear wheel carrier and the insertion member thereof.

The structure for restricting and allowing the rotation of the rear wheel 47 is nothing more than an example, and can be variously modified. For example, the aforementioned structure relating to the engagement groove 116 and the insertion member 119 may be modified as shown in FIGS. 30 to 32. According to these modifications, the condition in which the rotation of the rear wheel 47 is restricted and the condition in which the rotation of the rear wheel 47 is allowed can be switched, only by applying an external force to one orientation along one direction. The following modifications are described only about points different from the above embodiment. FIGS. 30 to 32 are views for explaining modification examples of the one rear wheel carrier (first rear wheel carrier) 50a and schematically showing the body of the rear wheel carrier and the sliding member, which are in an exploded condition. In FIGS. 30 to 32, the parts that can be structured identically to those in the above embodiment are indicated by the same reference numbers.

In the example shown in FIG. 30, the structure is identical to the above embodiment, excluding the path (contour) of the engagement groove 116. In the example shown in FIG. 30, the sliding member 111 (restriction engagement member 55) is held on the first holding position when the insertion member 119 is located on the first turning position p1 of the engagement groove 116, and the sliding member 111 (restriction engagement member 55) is held on the second holding position when the insertion member 119 is located on the third turning position p3 of the engagement groove 116. In addition, the second turning position p2 and the fourth turning position p4 are located on positions different from each other in the one direction, and the first turning position p1 and the third turning position p3 are located on positions different from each other in the one direction. The second turning position p2 and the fourth turning position p4 are located between the first turning position p1 and the third turning portion p3 in the other direction.

In the example shown in FIG. 31, the engagement groove 116 is formed on the one surface 115 of the body 51. The insertion member 119 is held on the sliding member 111 at the other side end thereof. In the example shown in FIG. 31, the sliding member 111 (restriction engagement member 55) is held on the first holding position when the insertion member 119 is located on the second turning position p2 of the engagement groove 116, and the sliding member 111 (restriction engagement member 55) is held on the second holding position when the insertion member 119 is located on the fourth turning position p4 of the engagement groove 116. In addition, the second turning position p2 and the fourth turning position p4 are located on positions different from each other in the one direction, and the first turning position p1 and the third turning position p3 are located on positions different from each other in the one direction. The first turning position p1 and the third turning position p3 are located between the second turning position p2 and the fourth turning position p4 in the other direction.

In the example shown in FIG. 32, the engagement groove 116 is formed on the one surface 115 of the body 51. The insertion member 119 is held on the sliding member 111 at the other side end thereof. In the example shown in FIG. 32, the sliding member 111 (restriction engagement member 55) is held on the first holding position when the insertion member 119 is located on the fourth turning position p4 of the engagement groove 116, and the sliding member 111 (restriction engagement member 55) is held on the second holding position when the insertion member 119 is located on the second turning position p2 of the engagement groove 116. In addition, the second turning position p2 and the fourth turning position p4 are located on positions different from each other in the one direction. The second turning position p2 and the fourth turning position p4 are located between the first turning position p1 and the third turning position p3 in the other direction.

As described above, disposed between the one rear wheel carrier 50a as structured above and the other rear wheel carrier 50b is the transmission mechanism 100 for transmitting a movement motion of the sliding member of the one rear wheel carrier (first rear wheel carrier) 50a to the other rear wheel carrier (second rear wheel carrier) 50b. Due to this structure, in the stroller 10 in this embodiment, only by performing the aforementioned significantly easy and simple operation to the operation part 113 of the one rear wheel carrier 50a, not only the rear wheel 47 supported on the one rear wheel carrier 50a but also the rear wheel 47 supported on the other rear wheel carrier 50b can be subjected to the rotation restricting operation and the rotation derestricting operation. Herebelow, the other rear wheel carrier 50b and the transmission mechanism 100 are described.

Figure 29:
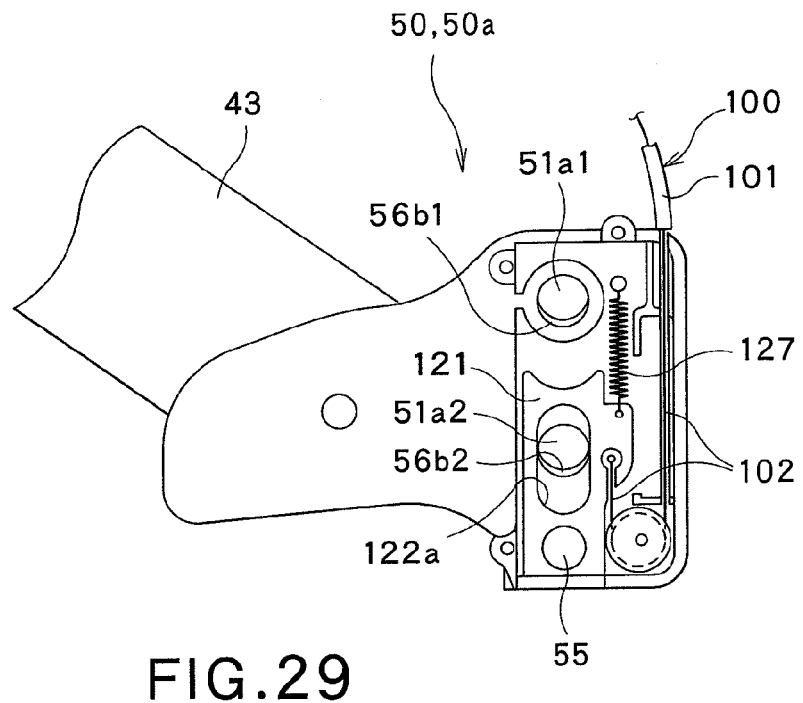
FIG. 29 is a view showing a longitudinal section of the other rear wheel carrier shown in FIG. 25.

As shown in FIG. 29, the rear wheel carrier 50b includes the aforementioned body (casing) 51 for holding the axle 46 of the wheel unit 45, a sliding member 121 that is slidable with respect to the body 51 in one direction, and an urging member 127 urging the sliding member 121 onto the body 51 from one side along the one direction toward the other side opposite to the one side. The sliding member 121 is provided with the restriction engagement member 55.

The sliding member 121 can be moved in the body 51 between the first holding position and the second holding position (position shown by the solid line in FIG. 27) located nearer to the other side than the first holding position along the one direction. When the sliding member 121 is held on the second holding position (condition shown in FIG. 25), the restriction engagement member 55 is engaged with the restriction groove 48c of the brake ring 48 of the wheel unit 45 so as to restrict the rotation of the rear wheel 47 with respect to the axle 46. On the other hand, when the sliding member 121 is held on the first holding position, the engagement between the restriction engagement member 55 and the wheel unit 45 is released, i.e., the restriction engagement member 55 is disengaged from the restriction groove 48c of the brake ring 48 of the wheel unit 45, so that the rotation of the rear wheel 47 with respect to the axle 46 is allowed.

As shown in FIG. 29, an elongated hole 122a is formed in the sliding member 121. The elongated hole 122a is formed in a position facing the hole 51a2 into which the aforementioned axle 46a or 46b is inserted.

As shown in FIGS. 26 and 29, the transmission mechanism 100 includes a tubular member 101 such as a tube, and a wire 102 slidably inserted through the tubular member 101. As shown in FIGS. 26 and 29, both ends of the tubular member 101 are respectively fixed on the body 51 of the one rear wheel carrier 50a and the body 51 of the other rear wheel carrier 50b. As shown in FIG. 26, one end of the wire 102 is extended over the one end of the tubular member 101 so as to be fixed on the sliding member 111 of the one rear wheel carrier 50a. When the sliding member 111 of the one rear wheel carrier 50a is moved to the one side along the one direction, the wire 102 is drawn out from the tubular member 101 to the side of the one rear wheel carrier 50a. As shown in FIG. 29, the other end of the wire 102 is extended over the other end of the tubular member 101 so as to be fixed on the sliding member 121 of the other rear wheel carrier 50b. When the sliding member 121 of the other rear wheel carrier 50b is moved to the other side along the one direction, the wire 102 is pushed out from the tubular member 101 to the side of the one rear wheel carrier 50a.

As shown in FIGS. 1, 18 and 19, the transmission mechanism 100 passes through the second rear leg elements 42 of the pair of rear legs 40 so as to be extended between the one rear wheel carrier 50a and the other rear wheel carrier 50b. Owing to such a structure, the relative movement of the sliding member 121 of the one rear wheel carrier 50a along the one direction with respect to the body 51, and the relative movement of the sliding member 121 of the other rear wheel carrier 50b along the one direction with respect to the body 51 can be associated with each other. Namely, when the sliding member 121 of the one rear wheel carrier 50a is moved to the one side along the one direction, the sliding member 121 of the other rear wheel carrier 50b is moved to the one side along the one direction. On the other hand, when the sliding member 121 of the one rear wheel carrier 50a is moved to the other side along the one direction, the sliding member 121 of the other rear wheel carrier 50b is moved to the other side along the one direction.

According to this embodiment, the sliding member 121 of the other rear wheel carrier 50b is located on the first holding position when the sliding member 121 of the one rear wheel carrier 50a is located on the first holding position, and the sliding member 121 of the other rear wheel carrier 50b is located on the second holding position when the sliding member 121 of the one rear wheel carrier 50a is located on the second holding position. Namely, when the rotation of the rear wheel 47 of the one wheel unit (first wheel unit) 45 held on the one rear wheel carrier 50a is restricted, the rotation of the rear wheel 47 of the other wheel unit (second wheel unit) 45 held on the other rear wheel carrier 50b is also restricted. Similarly, when the restriction on the rotation of the rear wheel 47 of the one wheel unit 45 held on the one rear wheel carrier 50a is released, the restriction on the rotation of the rear wheel 47 of the other wheel unit 45 held on the other rear wheel carrier 50b is also released.

Next, the front leg 30 and the front-leg rotatably-supporting part 27 of the core member 25 are described in more detail. In the above example, the front-leg rotatably-supporting part 27 supports the pair of front legs 30 which extend downward so as to be gradually away from each other. The pair of front legs 30 and the front-leg rotatably-supporting part 27, which can be detached from the base part of the core member 25, constitute the front leg unit 29.

Figure 33:
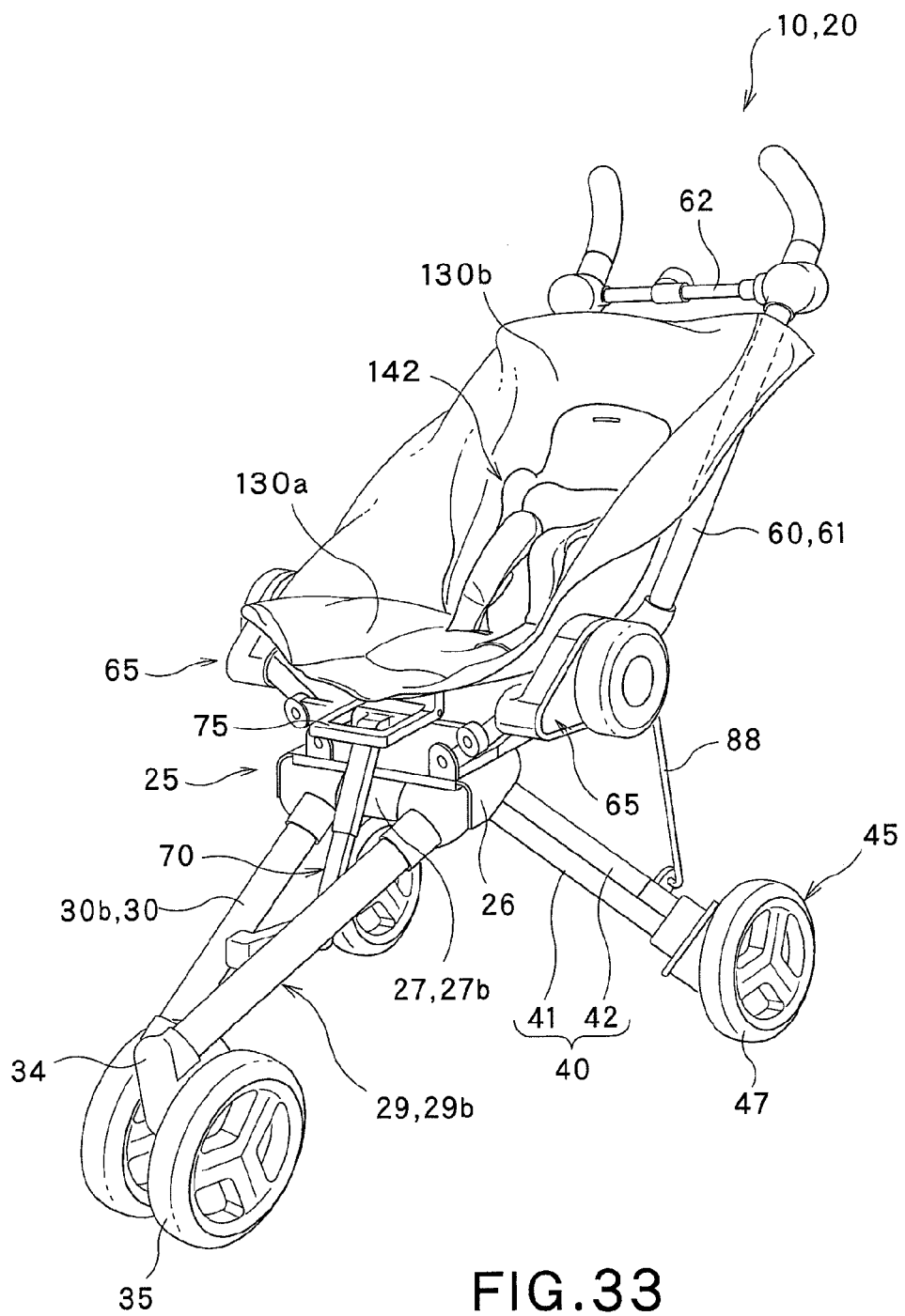
FIG. 33 is perspective view showing a stroller to which a second front leg unit is attached.

The stroller 10 in this embodiment includes, in addition to the aforementioned first front leg unit 29a composed of the pair of front legs 30 and the front-leg rotatably-supporting part 27 supporting the pair of front legs 30, a second front leg unit 29b which is alternatively used in place of the first front leg unit 29a. FIG. 33 shows the stroller 10 including the second front leg unit 29b.

The second front leg unit 29b includes a second front-leg rotatably-supporting part 27b detachably fixed on the base part 26 of the core member 25, and a second front leg 30b supported on the second front-leg rotatably-supporting part 27b. The second front-leg rotatably-supporting part 27b has a pair of front leg elements 31 that are arranged in the vehicle width direction. The pair of front leg elements 31 extend downward from the core member 25, such that the front leg elements 31 come close to each other in the vehicle width direction. The pair of front leg elements 31 are connected to each other at ends thereof distant from the core member 25. A caster 34 having the pair of front wheels 35 is disposed on a lower end of the connected pair of front leg elements 31. As shown in FIG. 33, a separation distance between the pair of front wheels 35 is significantly shorter than a separation distance between the pair of rear wheels 47. Thus, it can be said that the stroller 10 shown in FIG. 3 to which the second front leg unit 29b is attached is structured as a three-wheel vehicle in terms of functional classification. On the other hand, it can be said that the aforementioned stroller 10 to which the first front leg unit 29a is attached is structured as a four-wheel vehicle in terms of functional classification.

When the one stroller 10 includes the replaceable two types of front leg units 29a and 29b, the suitable one of the front leg unit 29a and the front leg unit 29b can be selected, depending on a state of a road surface (ground surface, traveling surface) on which the stroller 10 travels. As one example, when the stroller 10 travels on a rough road surface, the first front leg unit 29a is preferably selected. Since the stroller 10 having the first front leg unit 29a functions as a four-wheel vehicle, the traveling property can be enhanced. Thus, it is possible that stroller 10 placing thereon a baby can travel safely and more stably. As another example, when the stroller 10 travels in a crowded place, the second front leg unit 29b is preferably selected. Since the stroller 10 having the second front leg unit 29b functions as a three-wheel vehicle, so that the stroller 10 can have a small turning circle whereby the maneuverability of the stroller 10 can be enhanced.

In the front leg unit 29b shown in FIG. 33, the second leg 30b is rotatably (swingably) supported on the second front-leg rotatably-supporting part 27b. Namely, in the folded condition, the second front leg 30b can be swung with respect to the second front-leg rotatably-supporting part 27b, such that the end of the front leg 30b, which supports the caster 34, is moved rearward along the back and forth direction. In this embodiment, a part of the front-leg link mechanism 70 can be replaced in accordance with the replacement of the front leg unit 29. Specifically, the connection link 81 and the front-leg coupling link 78 of the front-leg link mechanism 70 can be replaced, simultaneously with the replacement of front leg unit 29. By replacing the part of the front-leg link mechanism 70 depending on the structure of the front leg 30, the swinging motion of the front leg unit 29 can be associated with the swinging motion of the handle member 60 (rotating motion of the arm member 65).

Similarly to the aforementioned front leg unit 29a, the second front leg unit 29b preferably includes the deformation urging member 17 (see FIG. 9) that urges the rotating motion of the front leg 30 with respect to the front-leg rotatably-supporting part 27 from the used condition to the folded condition. According to this deformation urging member 17, the front leg 30 is urged onto the front-leg rotatably-supporting part 27 in a definite orientation, so that the front leg 30 is prevented from being freely swung with respect to the front-leg rotatably-supporting part 27. Thus, due to the provision of the deformation urging member 71, not only the folding operation of the vehicle body 20 can be facilitated, which is as described above, but also the replacement work of the front leg unit 29 can be facilitated.

Next, the seat 130 attached to the vehicle body 20 of the stroller 10 is described.

As shown in FIG. 2, the seat 130 functioning as a seat part or a bed part for a baby is detachably attached to the vehicle body 20. As shown in FIGS. 1, 2 and 16, in this embodiment, the seat 130 is provided with a pair of fixing rods 131, and the handle holding part 67 of the arm member 65 is provided with a holding hole 12 for receiving the rod 131 of the seat 130. Disposed in the holding hole 12 is a locking mechanism (not shown) for locking a fixing pin (not shown) protruding from the rod 131. By inserting the pair of rods 131 into the holding holes 12 to place the seat 130 on the vehicle body 20, the seat 130 is automatically fixed on the vehicle body 20. In order to detach the seat from the vehicle body 20, the release switch 13 disposed on the handle support member 67 is operated so as to release the engagement between the rods 131 of the seat 130 and the holding holes 12 of the vehicle body 20, whereby the seat 130 can be detached from the vehicle body 20.

In the example shown in FIG. 2, the seat 130 includes a seat part 130a and a backrest part 130b coupled to the seat part 130a. In this embodiment, as shown in FIG. 2, the seat 130 can be attached to the vehicle body 20, such that the baby on the seat 130 faces forward (backside positioning). In addition, reversely to the embodiment shown in FIG. 2, the seat 130 can be reversed and attached to the vehicle body 20, such that the baby faces the operator (caregiver) who operates the stroller 10 (face-to-face positioning).

However, the seat 130 shown in FIG. 2 is nothing more than an example, and various types of seats can be used as described below. In addition, it is possible to prepare a plurality of detachable seats, and to select a suitable seat to be used in consideration of weather conditions and/or season conditions.

Figure 34:
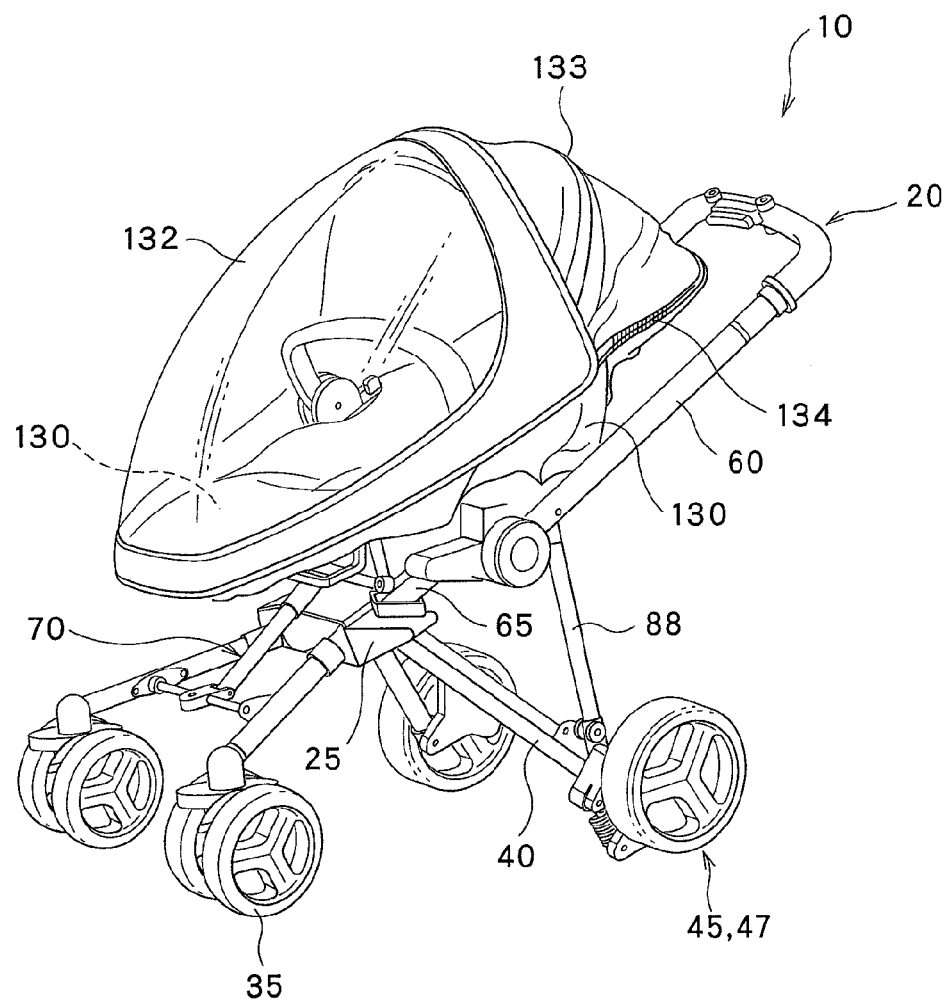
FIG. 34 is a perspective view for explaining a first modification of the seat.

In the example shown in FIG. 34, an openable and closable roof 133 and a breakwind 132 including a transparent hood are attached to the seat 130 shown in FIG. 1. In this example, by fixing the roof 133 and the breakwind 132 on a whole periphery of the seat 130 with the use of a fixing means 134 such as a fastener, rain and wind can be prevented from entering a board space of the baby. In addition, by defining a small gap between the roof 133 and the breakwind 132, effects such as ventilation and temperature adjustment in the board space can be expected. Further, a ventilation hole may be formed in the seat 130 and the like. In this case, owing to the ventilation hole and the gap between the roof 133 and the breakwind 132, comfortableness in the board space of the baby can be retained. A filter is preferably provided in the ventilation hole.

Figure 35:
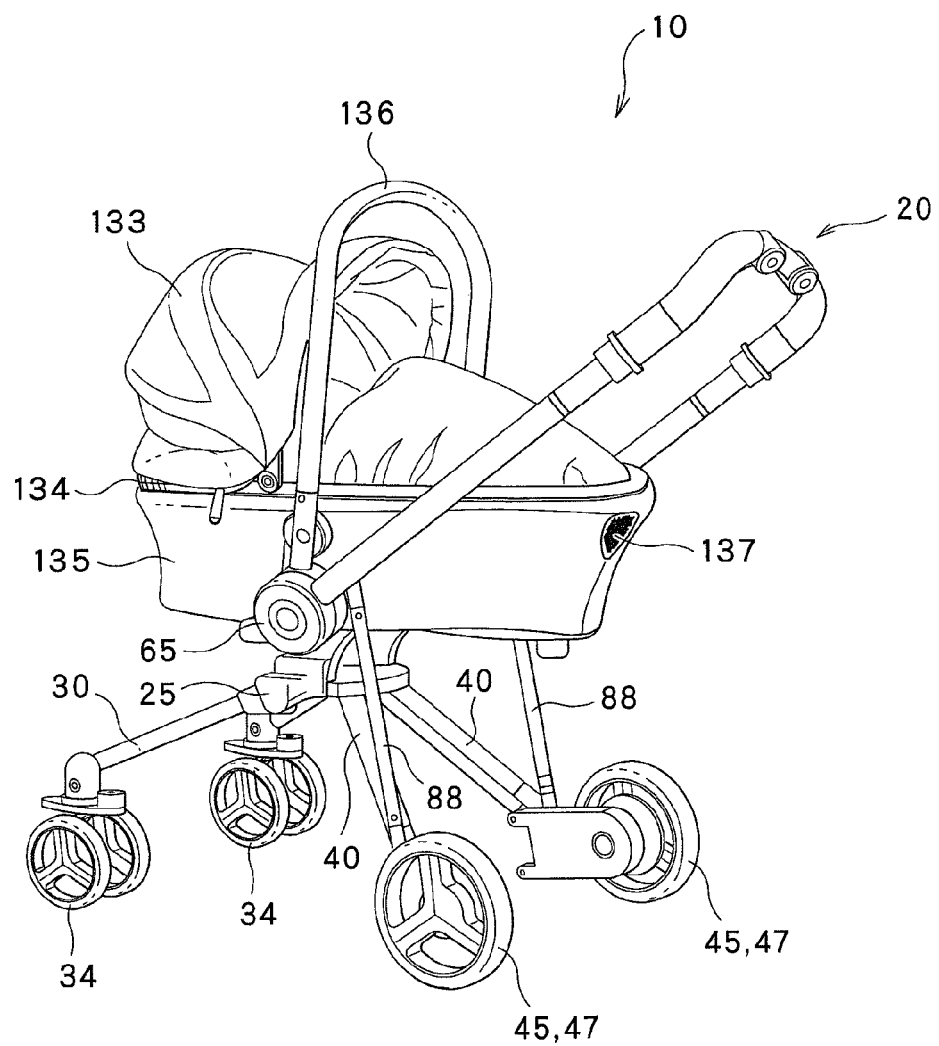
FIG. 35 is a perspective view for explaining a second modification of the seat.

In the example shown in FIG. 35, a seat 135 is structured to function both as a bed and a baby carrier. The seat 135 is provided with a handle 136 which can be used when the seat 135 is used as a baby carrier. The aforementioned roof 133 is fixed on the illustrated seat 135 through the fixing means 134.

In addition, the aforementioned breakwind 132 can be attached to the seat 135. The seat 135 is provided with a ventilation hole 137. Thus, even when the windbreak 132 is attached to the seat 135, ventilation between the board space of the baby and the outside is possible. A filter for cleaning air is preferably provided in the ventilation hole 137.

Figure 36:
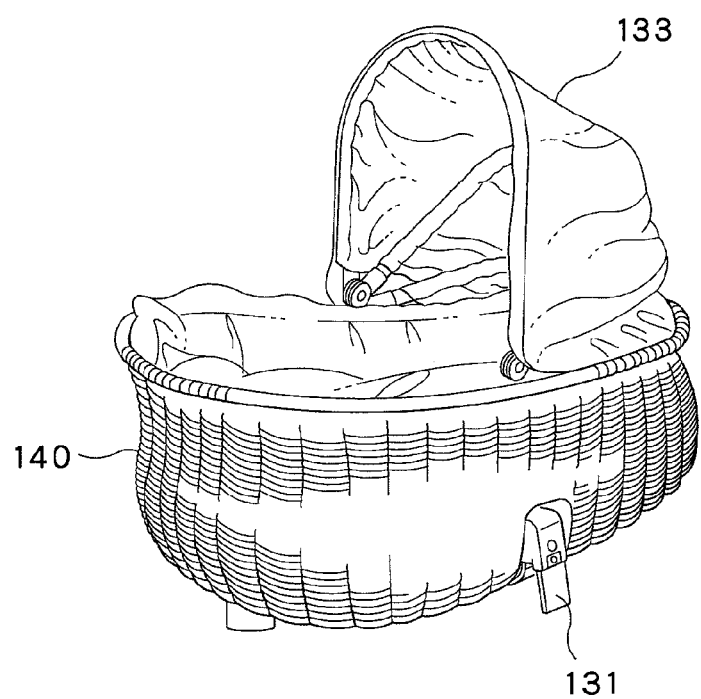
FIG. 36 is a perspective view for explaining a third modification of the seat.

In the example shown in FIG. 36, similarly to the example shown in FIG. 35, a seat 140 is structured to function both as a bed and a baby carrier. However, in order to assure a good breathability, the seat 140 is formed of cane. The roof 133 is disposed on the seat 140.

It is preferable that both of the seat 135 shown in FIG. 35 and the seat 140 shown in FIG. 36 enable the aforementioned face-to-face positioning and the backside positioning.

In the example shown in FIG. 33, a seat 142 is formed by attaching a fabric member to the handle member 60 and the arm members 65 of the vehicle body 20. According to this embodiment, the stroller 10 can be folded without detaching the seat 142 from the vehicle body 20.

Further, the seat can be structured to also function as a child seat (child car seat) that can be fixed on a seat of an automobile, when the seat is detached from the vehicle body 20.

Further, a strip member may be provided on the seat. In this case, with the use of the strip member, the seat detached from the vehicle body 20 can be fixed on a body of the caregiver, with a baby on the seat. As one example, the seat may be carried on a back of the caregiver. This embodiment is convenient in case where the baby in the stroller should be rapidly let out from the stroller. In addition, under these circumstances, a load on the caregiver can be significantly eased.

According to this embodiment, in the used condition, the front legs 30 and the rear legs 40 extend downward from the core member 25 positioned on substantially the center of the vehicle body 20, such that the distances between the front legs 30 and the rear legs 40 gradually broaden in the vehicle width direction and the back and forth direction. The stroller 10 including such a vehicle body 20 can have an effectively improved rigidity, whereby the stability during traveling can be assured. In the folded condition, the ends of the front legs 30 and the rear legs 40, which are opposite to the core member 25, are positioned nearer to each other, as compared with the used condition, due to the swinging motions of the front legs 30 and the rear legs 40 with respect to the core member 25. Thus, the dimensions of the stroller 10 in the folded condition can be reduced in the back and forth direction and the vehicle width direction. That is to say, according to this embodiment, the dimensions of the stroller 10 can be made small, while improving the rigidity thereof.

In addition, according to this embodiment, there is provided the handle member 60 including the pair of handle extending parts 61 rotatably connected to a frame structure including the front legs 30 and the rear legs 40, and the bendable bending part 62 coupling the pair of handle extending parts 61. Due to the swinging motion of the pair of handle extending parts 61 with respect to the frame structure, the handle member 60 and the rear legs 40 are located on positions where an angle defined between each handle extending part 61 and each rear leg 40 is smaller in the folded condition as compared with the used condition. In addition, in the folded condition, the bending part 62 is bent to protrude to the side close to the frame structure. According to this stroller 10, in the folded condition, the extension length of the handle member 60 from the frame structure can be shortened, as well as the dimensions of the handle member 60 in the vehicle width direction can be decreased.

Further, according to this embodiment, there are provided the first front leg unit 29a that can be attached to the base part 27, and the second front leg unit 29b that can be attached to the base part 26, which can be alternatively used in place of the first front leg unit 29a. When one of the first front leg unit 29a and the second front leg unit 29b is used, the stroller 10 can function as a three-wheel vehicle. When the other of the first front leg unit 29a and the second front leg unit 29b is used, the stroller 10 can function as a four-wheel vehicle. According to this stroller 10, by selecting either the first front leg unit 29a or the second front leg unit 29b depending on a state of a road surface on which the stroller 10 travels, the maneuverability or the traveling stability can be enhanced.

Further, according to this embodiment, the stroller 10 includes: the frame structure having the front legs 30 and the rear legs 40; the rear wheel carrier 50 attached to each rear leg 40; the first rear wheel unit 45a including the first rear wheel 47a, the first rear wheel unit 45a capable of being detachably supported on the rear wheel carrier 50; and the second rear wheel unit 45b including the second rear wheel 47b, the second rear wheel unit 45 capable of being detachably supported on the rear wheel carrier 50 and of being alternatively used in place of the first rear wheel unit 45a. The diameter of the rear wheel 47a and the diameter of the rear wheel 47b differ from each other. According to this stroller 10, by selecting either the first rear wheel unit 45a or the second rear wheel unit 45b depending on a state of a road surface on which the stroller 10 travels, the maneuverability or the traveling stability can be enhanced.

Further, according to this embodiment, for each time when an external force is applied from the other side to the one side along the one direction, it is possible to switch the condition in which the rotation of the rear wheels 47 is restricted, and the condition in which the rotation of the rear wheels 47 is allowed. According to this stroller 10, since the operation is easy and simple, the condition in which the rotation of the rear wheels 47 is restricted, and the condition in which the rotation of the rear wheels 47 is allowed, can be more exactly switched.

What is claimed is:

1. A carrier for holding a wheel unit including a wheel and an axle rotatably holding the wheel, comprising:
    a body for holding the axle of the wheel unit;
    a sliding member capable of being slid in one direction with respect to the body, the sliding member being configured to be held on one of a first holding position and a second holding position which is located nearer to one side along the one direction than the first holding position;
    an urging member supported on the body, the urging member being configured to urge the sliding member to the body from the one side to the other side along the one direction; and
    a restriction engagement member attached to the sliding member, the restriction engagement member being configured to be engaged with the wheel unit so as to restrict a rotation of the wheel with respect to the axle, when the sliding member is held on one of the first holding position and the second holding position, and being configured to be disengaged from the wheel unit so as to allow the rotation of the wheel with respect to the axle, when the sliding member is held on the other of the first holding position and the second holding position;
    wherein the sliding member is configured such that the position on which the sliding member is held after the sliding member has been returned from the one side to the other side by an urging force of the urging member, is alternately changed between the first holding position and the second holding position, for each time when the sliding member is slid from the other side toward the one side along the one direction, wherein the axle is received in a hole formed in the body and in an elongated hole formed in the sliding member, the elongated hole being formed at a position, facing the hole of the body of the sliding member, and wherein one of the body and the sliding member includes a surface which is substantially in parallel with the one direction and has a linearly extending groove, an insertion member is supported on the other of the body and the sliding member and engages with the linearly extending groove, and the linearly extending groove includes a path with variable depth.

2. The carrier according to claim 1, wherein:

a distal end of the insertion member is located in the groove, with a displacement of the insertion member toward the one direction being restricted;

the path includes a first groove path extending from a first turning position to a second turning position that is located on a position nearer to the other side than the first turning position in the one direction, a second groove path extending from the second turning position to a third turning position that is located on a position nearer to the one side than the second turning position in the one direction, a third groove path extending from the third turning position to a fourth turning position that is located on a position nearer to the other side than the third turning position in the one direction, and a fourth groove path extending from the fourth turning position to the first turning position that is located nearer to the one side than the fourth turning position in the one direction; and the groove and the insertion member are configured such that the insertion member arrives at the first to fourth turning positions in this order, so as to circulate in the groove.

3. The carrier according to claim 2, wherein when no external force is applied to the sliding member, the groove and the insertion member are configured to be located on the first turning position or the third turning position, by the urging force of the urging member.

4. The carrier according to claim 2, wherein the first turning position and the third turning position are located between the second turning position and the fourth turning position in a direction perpendicular to the one direction in the surface having the groove.

5. The carrier according to claim 2, wherein in an area of the groove where the first groove path and the second groove path are merged, a depth of the groove of the second groove path is greater than a depth of the groove of the first groove path, so that a step along the second groove path is formed, the step enabling that the insertion member having arrived at the second turning position is then guided to the third turning position along the second groove path;

in an area of the groove where the second groove path and the third groove path are merged, a depth of the groove of the third groove path is greater than the depth of the groove of the second groove path, so that a step along the third groove path is formed, the step enabling that the insertion member having arrived at the third turning position is then guided to the fourth turning position along the third groove path;

in an area of the groove where the third groove path and the fourth groove path are merged, a depth of the groove of the fourth groove path is greater than the depth of the groove of the third groove path, so that a step along the fourth groove path is formed, the step enabling that the insertion member having arrived at the fourth turning position is then guided to the first turning position along the fourth groove path; and in an area of the groove where the fourth groove path and the first groove path are merged, the depth of the groove of the first groove path is greater than the depth of the groove of the fourth groove path, so that a step along the first groove path is formed, the step enabling that the insertion member having arrived at the first turning position is then guided to the second turning position along the first groove path.

6. The carrier according to claim 2, wherein the surface having the groove and the insertion member are pressed toward each other, and a distal end of the insertion member is in contact with the bottom surface of the groove.

7. The carrier according to claim 1, wherein the sliding member is configured such that the position on which the sliding member is held after the sliding member has been returned from the one side to the other side by the urging force of the urging member, is alternately changed between the first holding position and the second holding position, for each time when the sliding member is slid to a position nearest to the one side within the slidable range along the one direction.

8. The carrier according to claim 1, wherein the sliding member is provided with an operation part through which an external force for pressing the sliding member from the other side to the one side can be applied, and the operation part is positioned outside the body, and is moved in the one direction in conjunction with the restriction engagement member.

9. A stroller comprising:

a frame structure including a front leg and a pair of rear legs; and a carrier according to claim 1, the carrier being attached to at least one of the rear legs.

10. A stroller comprising:

a frame structure including a front leg and a pair of rear legs;

a first carrier according to claim 1, the carrier being attached to one of the rear legs; and a second carrier for holding a wheel unit including a wheel and an axle for rotatably holding the wheel, the second carrier being attached to the other of the rear legs;

wherein:

the second carrier includes a body for holding the axle of the wheel unit, a sliding member supported on the body, the sliding member being capable of being slid between a first holding position and a second holding position, and a restriction engagement member attached to the sliding member, the restriction engagement member being configured to be engaged with the wheel unit so as to restrict a rotation of the wheel with respect to the axle, when the sliding member is held on one of the first holding position and the second holding position, and being configured to be disengaged from the wheel unit so as to allow the rotation of the wheel with respect to the axle, when the sliding member is held on the other of the first holding position and the second holding position; and there is provided a transmission mechanism that extends between the sliding member of the first carrier and the sliding member of the second carrier, the transmission mechanism being configured to move the sliding member of the second carrier in conjunction with the movement of the sliding member of the first carrier.

11. A stroller comprising:
a frame structure including a front leg and a pair of rear legs; and
a pair of rear wheel carriers attached to the respective rear legs;
a pair of first rear wheel units each including an axle detachably supported on each rear wheel carrier and a first wheel rotatably held on the axle; and
a pair of second rear wheel units each including an axle detachably supported on each rear wheel carrier, and a second wheel rotatably held on the axle, the pair of second rear wheel units being alternatively used in place of the first rear wheel units, a diameter of the first wheel and a diameter of the second wheel differ from each other,
wherein each of the pair of rear wheel carriers includes:
a body for holding the axle of the wheel unit;
a sliding member capable of being slid in one direction with respect to the body, the sliding member being configured to be held on one of a first holding position and a second holding position which is located nearer to one side along the one direction than the first holding position;
an urging member supported on the body, the urging member being configured to urge the sliding member to the body from the one side to the other side along the one direction; and
a restriction engagement member attached to the sliding member, the restriction engagement member being configured to be engaged with the wheel unit so as to restrict a rotation of the wheel with respect to the axle, when the sliding member is held on one of the first holding position and the second holding position, and being configured to be disengaged from the wheel unit so as to allow the rotation of the wheel with respect to the axle, when the sliding member is held on the other of the first holding position and the second holding position,
wherein the sliding member is configured such that the position on which the sliding member is held after the sliding member has been returned from the one side to the other side by an urging force of the urging member, is alternately changed between the first holding position and the second holding position, for each time when the sliding member is slid from the other side toward the one side along the one direction, and
wherein the axle is received in a hole formed in the body of at least one of the pair of rear wheel carriers and in an elongated hole formed in the sliding member, the elongated hole formed at a position, facing the hole of the body, of the sliding member.

* * * * *